(12) United States Patent
Ramon-Gimenez et al.

(10) Patent No.: US 9,109,160 B2
(45) Date of Patent: Aug. 18, 2015

(54) REACTIVE MESOGEN BASED POLYMER PARTICLES

(75) Inventors: Laura Ramon-Gimenez, Southampton (GB); Jonathan Henry Wilson, Southampton (GB); Owain Llyr Parri, Ringwood (GB); Mark John Goulding, Ringwood (GB); Roger Kemp, Winchester (GB); Louise Diane Farrand, Dorset (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/116,454

(22) PCT Filed: May 3, 2012

(86) PCT No.: PCT/EP2012/001898
§ 371 (c)(1),
(2), (4) Date: Nov. 8, 2013

(87) PCT Pub. No.: WO2012/152409
PCT Pub. Date: Nov. 15, 2012

(65) Prior Publication Data
US 2014/0085709 A1    Mar. 27, 2014

(30) Foreign Application Priority Data
May 9, 2011    (EP) .................................. 11003774

(51) Int. Cl.
*C09K 19/60* (2006.01)
*C09K 19/38* (2006.01)
*G02F 1/167* (2006.01)
*C09K 19/04* (2006.01)

(52) U.S. Cl.
CPC ............. *C09K 19/3809* (2013.01); *C09K 19/60* (2013.01); *G02F 1/167* (2013.01); *C09K 2019/0448* (2013.01); *C09K 2219/00* (2013.01)

(58) Field of Classification Search
CPC ................................. C09K 19/60; C09K 19/38
USPC .......................................... 359/296; 345/107
See application file for complete search history.

(56) References Cited

U.S. PATENT DOCUMENTS 5,380,362 A    1/1995    Schubert
5,403,518 A    4/1995    Schubert
(Continued)

FOREIGN PATENT DOCUMENTS

DE    19504224 A1    8/1995
DE    19602795 A1    7/1997
(Continued)

OTHER PUBLICATIONS

Haseloh et al. (Macromol. Rapid Commun. 2011, 32, 88-93).*
(Continued)

*Primary Examiner* — Vu A Nguyen
(74) *Attorney, Agent, or Firm* — Drinker Biddle & Reath LLP

(57) ABSTRACT

This invention relates to polymer particles comprising monomer units of at least one reactive mesogen, a process for their preparation, the use of these particles for the preparation of optical, electrooptical, electronic, electrochemical, electrophotographic, electrowetting and electrophoretic displays and/or devices and security, cosmetic, decorative, and diagnostic applications, and electrophoretic fluids and displays.

21 Claims, 3 Drawing Sheets

Red blood cell-like particle    LC molecule

(56) References Cited

U.S. PATENT DOCUMENTS

| | | | |
|---|---|---|---|
| 5,518,652 | A | 5/1996 | Parri et al. |
| 5,560,864 | A | 10/1996 | Goulding |
| 5,750,051 | A | 5/1998 | Goulding et al. |
| 5,770,107 | A | 6/1998 | Hassall et al. |
| 5,783,614 | A | 7/1998 | Chen et al. |
| 5,942,030 | A | 8/1999 | Schuhmacher et al. |
| 6,136,225 | A | 10/2000 | Meyer et al. |
| 6,194,488 | B1 | 2/2001 | Chen et al. |
| 6,514,578 | B1 | 2/2003 | Farrand |
| 6,956,690 | B2 | 10/2005 | Yu et al. |
| 7,038,655 | B2 | 5/2006 | Herb et al. |
| 7,052,766 | B2 | 5/2006 | Zang et al. |
| 7,110,162 | B2 | 9/2006 | Wu et al. |
| 7,170,670 | B2 | 1/2007 | Webber |
| 7,226,550 | B2 | 6/2007 | Hou et al. |
| 7,236,290 | B1 | 6/2007 | Zhang et al. |
| 7,247,379 | B2 | 7/2007 | Pullen et al. |
| 7,277,218 | B2 | 10/2007 | Hwang et al. |
| 7,304,634 | B2 | 12/2007 | Albert et al. |
| 2007/0128352 | A1 | 6/2007 | Honeyman et al. |
| 2007/0268244 | A1 | 11/2007 | Chopra et al. |

FOREIGN PATENT DOCUMENTS

| | | |
|---|---|---|
| DE | 19602848 A1 | 7/1997 |
| EP | 0261712 A1 | 3/1988 |
| EP | 1669431 A1 | 6/2006 |
| GB | 2438436 A | 11/2007 |
| JP | H10-062739 | 3/1998 |
| JP | 2001-262144 A | 9/2001 |
| WO | WO-93/22397 A1 | 11/1993 |
| WO | WO-95/22586 A1 | 8/1995 |
| WO | WO-97/00600 A2 | 1/1997 |
| WO | WO-99/10767 A1 | 3/1999 |
| WO | WO-03027761 A2 | 4/2003 |
| WO | WO-2004/005425 A1 | 1/2004 |
| WO | WO-2005/017046 A2 | 2/2005 |
| WO | WO-2008/061606 A1 | 5/2008 |
| WO | WO-2009/100803 A2 | 8/2009 |
| WO | WO-2010/089057 A2 | 8/2010 |
| WO | WO-2010/089058 A1 | 8/2010 |
| WO | WO-2010/089059 A1 | 8/2010 |
| WO | WO-2010/089060 A2 | 8/2010 |

OTHER PUBLICATIONS

Yamada et al. J. Mater. Chem., 2009, 19, 60-62.*

International Search Report for PCT/EP2012/001898 mailed Jun. 20, 2012.

Kim, Jin-Woong, et al., "Uniform Nonspherical Colloidal Particles with Tunable Shapes", Adv. Mater., vol. 19, (2007), pp. 2005-2009.

Cairns, Darran R., et al., "Switching Dynamics of Suspended Mesogenic Polymer Microspheres", Applied Physics Letters, vol. 78, No. 18, (2001), pp. 2643-2645.

Elsesser, Mark T., et al., "Large Core- Shell Poly(methyl Methacrylate) Colloidal Clusters: Synthesis, Characterization, and Tracking", Langmuir, vol. 27, No. 3, (2011), pp. 917-927.

Fujibayashi, Teruhisa, et al., "Preparation and Thermodynamic Stability of Micron-Sized, Monodisperse Composite Polymer Particles of Disc-Like Shapes by Seeded Dispersion Polymerization", Langmuir, vol. 23, (2007), pp. 7958-7962.

Mock, Eric B., et al., "Synthesis of Anisotropic Nanoparticles by Seeded Emulsion Polymerization", Langmuir, vol. 22, (2006), pp. 4037-4043.

Kaneko, Tatsuo, et al., "One-Step Formation of Morphologically Controlled Nanoparticles with Projection Coronas", Macromolecules, vol. 37, (2004), pp. 501-506.

Spillman, Christopher M., et al., "Role of Surfactant in the Stability of Liquid Crystal-Based Nanocolloids", Langmuir, vol. 25, (2009), pp. 2419-2426.

Sandomirski, K., et al., "Highly Birefringent Colloidal Particles for Tracer Studies", J. Phys.: Condens. Matter, vol. 16, (2004), pp. S4137-S4144.

Shafran, Matthew, et al., "Electrically Switchable Liquid Crystal Polymer Rod Actuators", Mater. Res. Soc. Symp. Proc., vol. 1096, (2008), 6 pages.

Fernández-Nieves, Alberto, "Engineering Colloids with Optical and Geometrical Anisotropies: De-Coupling Size Monodispersity and Particle Properties", Soft Matter, vol. 2, (2006), pp. 105-108.

Yang, Zhongqiang, et al., "Shape-Memory Nanoparticles from Inherently Non-Spherical Polymer Colloids", Nature Materials, vol. 4, (2005), pp. 486-490.

Vennes, Melanie, et al., "Anisotropic Particles from LC Polymers for Optical Manipulation", Macromolecules, vol. 39, (2006), pp. 8326-8333.

Haseloh, Sönke, et al., "Synthesis of Liquid-Crystalline Colloids in Nonpolar Media and their Manipulation in Electric Fields", Macromol. Chem. Phys., vol. 210, (2009), pp. 1394-1401.

Ohm, Christian, et al., "A Continuous Flow Synthesis of Micrometer-Sized Actuators from Liquid Crystalline Elastomers", Adv. Mater., vol. 21, (2009), pp. 4859-4862.

Haseloh, Sönke, et al., "Control of Mesogen Configuration in Colloids of Liquid Crystalline Polymers", Soft Matter, vol. 6, (2010), pp. 4112-4119.

* cited by examiner

Red blood cell-like particle    LC molecule

REACTIVE MESOGEN BASED POLYMER PARTICLES

CROSS-REFERENCE TO RELATED APPLICATIONS

This application is a national stage application (under 35 U.S.C. §371) of PCT/EP2012/001898, filed May 3, 2012, which claims benefit of European Application No. 11003774.4, filed May 9, 2011. Both are incorporated herein by reference in their entirety.

BACKGROUND OF THE INVENTION

This invention relates to polymer particles comprising monomer units of at least one reactive mesogen, a process for their preparation, the use of these particles for the preparation of optical, electrooptical, electronic electrochemical, electrophotographic, electrowetting and electrophoretic displays and/or devices and security, cosmetic, decorative, and diagnostic applications, and electrophoretic fluids and displays.

Reactive mesogens (RMs), when polymerised at temperatures at which they exhibit thermotropic liquid crystal phases (typically nematic, cholesteric or smectic), produce polymers with a degree of optical anisotropy. This property has been widely exploited in the field of optical films for compensation and brightness enhancement in flat panel displays, especially liquid crystal displays.

It has been disclosed in WO 2003027761, DE 19602848, DE 19602795, JP 2001262144 and WO 2004005425 that a range of RMs can be used to prepare particles (sometimes described as flakes). These particles can reflect colours of various wavelengths and have proven applications in pigments, and broadband reflection films. In addition, a method of using particles containing various amount of RMs in electro-optical devices is disclosed in JP 10062739 which discusses a thermally switching PDLC device.

In 2001, Crawford et al. (Applied Physics Letters, 78(18), (2001), 2643-2645) prepared particles from RM257 using an emulsification process in glycerol, followed by an in-situ photopolymerisation step with UV light. These particles rotate under in-plane electric fields. Shafran et at. (Mater. Res. Soc. Symp. Proc. 1096 (2008)) also reported nano-rods made from RM257 using a template and UV light to fix the conformation. These rods show rotational and translational movement under DC and AC electric fields.

Preparation of anisotropic LC particles has been also described by Fernandez et al. (Soft Matter, 2, (2006), 105-108) using microfluidics to produce monodisperse particles in water. By increasing the quantity of PVA it is possible to make a film that can be stretched to obtain tactoidal particles. This conformation can be fixed by polymerization of the stretched film under UV light. Although this process can be used to obtain particles that have both shape and internal anisotropy, it is not a synthetic method that is suitable for making particles that can be directly used in an electro-optical device because the solvent used is too polar.

Sandomirski et al. prepared 100 nm-1 μm colloidal particles of RM257 by emulsification in aqueous solution and in-situ photopolymerisation (J. Phys.:Condens. Matter, 16, (2004), 4137-4144). Studies regarding formation and stability of LC colloids depending on surfactant have been performed by Spillmann et al. (Langmuir, 25, (2009), 2419-2426), in which 200 nm colloids were prepared by sonication of the RM dissolved in chloroform and water. Terentjev et al. synthesized particles made of main chain liquid crystal polymers via mini-emulsion technique (Nature Materials, 4, (2005), 486-490). They observed ellipsoidal particles with different aspect ratio depending on the particle size.

In the described prior art, the molecular orientation of the liquid crystal inside the particle was not determined because the particles were too small to be resolved by optical microscopy.

Zentel et al. showed that RM particles could also be made via dispersion polymerization in mixtures of ethanol/methoxyethanol (Macromolecules, 39, (2006), 8326-8333) and THF/silicon oil (Macromol. Chem. Phys, 210, (2009), 1394-1401 and Soft Matter, (2010), 6, 4112-4119). The spherical particles obtained by this method show optical anisotropy and could be manipulated under electric fields and optical tweezers. Zentel et al also synthesised elastomeric LC particles via microfluidics showing ellipsoidal shape (Adv. Mater, (2009), 21, 4859-4862). However, all these particles were only synthesised using monoacrylate RMs, which limits the range of application and flexibility of their properties. Micron sized spherical colloids synthesised by Zentel et al. exhibit optical anisotropy. However, a mixture of different director orientations is present inside the same system and they do not show shape anisotropy.

The above literature describes syntheses of particles which are not suitable for scale-up of the particles, i.e. using microfluidics it is only possible to produce a small volume of particles per day. The particles are made from a very limited range of RMs and so do not have desirable properties. In prior art, synthesis of particles has only been described using polar solvents and not low dielectric solvent. For display applications, in particular in EPD, it is crucial not to introduce polar impurities which will have an adverse effect on the operation of the display. It is known that if particles are prepared in a polar solvent, it is very difficult to remove all traces of the solvent. Traces of polar solvent on particle surfaces affect the ability of the particles to be transferred into a final solvent used in a display. In addition, particles which are prepared in a polar solvent and transferred to a non-polar solvent suitable for EPD such as dodecane or hexadecane will not disperse well and give poor display performance. It is therefore desirable to prepare particles for display applications, in particular for EPD in a non-polar solvent, and preferably in a solvent such as dodecane which can be used directly in the final display application; thus avoiding solvent transfer which is both expensive, time costly and can introduce undesired impurities in the display.

In summary, there is a need for new reactive mesogen derived polymer particles, especially with both shape anisotropy and optical anisotropy.

Therefore, this invention is concerned with the extension of the ability to create optically anisotropic polymers into the field of polymeric microparticles. A range of new and unexpected properties has been uncovered following the synthesis of polymeric microparticles from reactive mesogens in LC phases, such as the nematic, cholesteric and smectic. These properties make them potential materials for a large range of applications such as new display modes, electrophoretic displays and as additives in liquid crystalline mixtures. In some cases, the particles exhibit shape anisotropy as well as internal molecular anisotropy. This makes them especially interesting for the applications mentioned above.

BRIEF SUMMARY OF THE INVENTION

The present invention relates to polymer particles with optical anisotropy and shape anisotropy comprising monomer units of at least one reactive mesogen, a process for their preparation, the use of these particles for the preparation of optical, electrooptical, electronic, electrochemical, electrophotographic, electrowetting and electrophoretic displays and/or devices and security, cosmetic, decorative, and diagnostic applications, and electrophoretic fluids and displays comprising polymer particles with optical anisotropy and optionally shape anisotropy comprising monomer units of at least one reactive mesogen. Shape anisotropy in this case relates to but is not limited to, for example, red blood cell-like shape particles and tactoidal particles.

In particular, this invention concerns new polymer particles with optical anisotropy and shape anisotropy comprising monomer units of at least one reactive mesogen with at least two polymerisable group, at least one polymerisable dye as co-monomer, optionally at least one co-monomer, optionally at least one cross-linking co-monomer, optionally at least one ionic co-monomer, and optionally at least one polymerisable stabiliser.

DETAILED DESCRIPTION OF THE INVENTION

Figure 1:
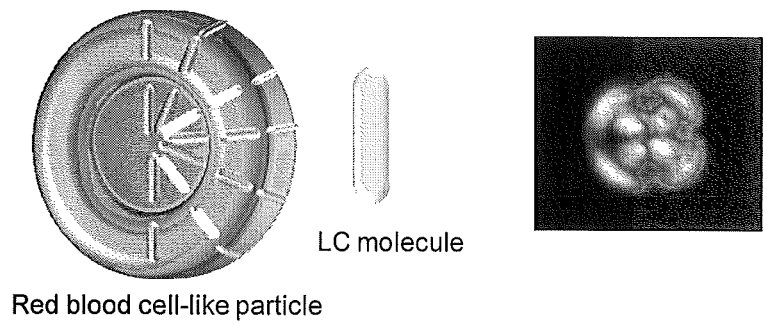
FIG. 1 shows a scheme of a red blood cell-like particle made of RM and internal LC director configuration (left) and image under cross-polarisers (right).

Preferably, the polymerisable dye used as co-monomer is selected from azo dyes, preferably monoazo dyes, disazo dyes, and/or metallised azo dyes, metallised dyes, anthraquinone dyes, phthalocyanine dyes, benzodifuranones dyes, Brilliant Blue derivatives, pyrroline dyes, squarilium dyes, triphendioxazine dyes or mixtures of these dyes. Polymer particles according to the invention can display shape anisotropy and internal molecular anisotropy.

The subject matter of this invention relates specifically to optically transparent, optionally coloured via a co-polymerised dye and shape anisotropic polymer particles prepared by emulsion polymerisation. These particles are especially of use in the field of electrophoretic displays because they exhibit electrophoretic mobility in a low dielectric media when subjected to an applied electrical field.

In addition, the particles may have the following properties: a homogeneous crosslinked network structure for solvent resistance, a non-swelling nature when dispersed in solvent media, impact strength, hardness, dispersibility in a non-polar continuous phase that is the most used media for display applications, high electrophoretic mobility in dielectric media, excellent switching behaviour, faster response times at comparable voltages, bright colour, tunable refractive index over a range making them suitable as scattering reflective or solvent matched particles. Additionally the low solubility of the materials in the continuous phase also reduces the tendency of the particles to undergo Ostwald ripening processes.

The new polymer particles according to the invention and the polymer particles used in the new electrophoretic fluids according to the invention can be prepared from a wide range of reactive mesogens. In principle any reactive mesogen with at least one polymerisable group, preferably at least two polymerisable groups is suitable. Particles can be made from one or a blend of several reactive mesogens, known as a reactive mesogen mixture (RMM). Particles can also contain an amount of a co-monomer which can be any suitable monomer which can copolymerise with the selected RM or RMM.

Coloured polymeric particles can be made through the methods described here by incorporating either a polymerisable dichroic dye or, preferably another polymerisable dye in the particle formation step. The term dichroic dye means the dye prefers to align with the director of the LC.

It is also possible to incorporate dye by swelling the formed particle in a suitable solvent with an added dye and then removing the swelling solvent by means of distillation or other method to leave coloured particles such as described in WO2009100803.

Dye can also be incorporated by swelling the formed particle in a suitable solvent with an added pre-polymerised dye and then removing the swelling solvent by means of distillation or other method to leave coloured particles such as described in WO2010/089058.

Coloured particles can also be prepared by swelling the formed particles in a suitable solvent with an added dye monomer and initiator, and polymerising this added dye in the particle, followed by removal of the swelling solvent as described in WO2010/089059.

The term "liquid crystal", "mesomorphic compound, or "mesogenic compound" (also shortly referred to as "mesogen") means a compound that under suitable conditions of temperature, pressure and concentration can exist as a mesophase or in particular as a LC phase. Non-amphiphilic mesogenic compounds comprise for example one or more calamitic, banana-shaped or discotic mesogenic groups.

The term "calamitic" means a rod- or board/lath-shaped compound or group. The term "banana-shaped" means a bent group in which two, usually calamitic, mesogenic groups are linked through a semi-rigid group in such a way as not to be co-linear.

The term "discotic" means a disc- or sheet-shaped compound or group.

The term "mesogenic group" means a group with the ability to induce liquid crystal (LC) phase behaviour. Mesogenic groups, especially those of the non-amphiphilic type, are usually either calamitic or discotic. The compounds comprising mesogenic groups do not necessarily have to exhibit an LC phase themselves. It is also possible that they show LC phase behaviour only in mixtures with other compounds, or when the mesogenic compounds or the mixtures thereof are polymerized. For the sake of simplicity, the term "liquid crystal" is used hereinafter for both mesogenic and LC materials.

A calamitic mesogenic compound is usually comprising a calamitic, i.e. rod- or lath-shaped, mesogenic group consisting of one or more aromatic or alicyclic groups connected to each other directly or via linkage groups, optionally comprising terminal groups attached to the short ends of the rod, and optionally comprising one or more lateral groups attached to the long sides of the rod, wherein these terminal and lateral groups are usually selected e.g. from carbyl or hydrocarbyl groups, polar groups like halogen, nitro, hydroxy, etc., or polymerisable groups.

A discotic mesogenic compound is usually comprising a discotic, i.e. relatively flat disc- or sheet-shaped mesogenic group consisting for example of one or more condensed aromatic or alicyclic groups, like for example triphenylene, and optionally comprising one or more terminal groups that are attached to the mesogenic group and are selected from the terminal and lateral groups mentioned above.

The term "reactive mesogen" (RM) means a polymerisable mesogenic or liquid crystalline compound, which is preferably a monomeric compound.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

The term "spacer" or "spacer group", also referred to as "Sp" below, is known to the person skilled in the art and is described in the literature. Unless stated otherwise, the term "spacer" or "spacer group" above and below denotes a flexible organic group, which in a polymerisable mesogenic compound ("RM") connects the mesogenic group and the polymerisable group(s).

The reactive mesogens according to the invention contain preferably at least one polymerisable group like methacrylates, acrylates, methacrylamides, acrylamides, acrylonitriles, α-substituted acrylates, styrenes, vinyl, substituted vinyl. Especially preferred are methacrylate and/or acrylate groups. Preferably the RMs contain at least two polymerisable groups, especially two methacrylate and/or acrylate groups. Mixtures of RMs with one polymerisable groups and RMs with at least two polymerisable groups are also preferred.

Also, mixtures of RMs with at least two polymerisable groups may be used. Mixtures of RMs with one polymerisable groups and RMs with at least two polymerisable groups may also be used.

Mixtures of RMs with two polymerisable groups and RMs with at least three polymerisable groups can preferably be used.

In another preferred variant of the invention, mixtures of RMs with two polymerisable groups and chiral RMs are used.

RMs with at least two polymerisable groups according to the invention are preferably selected from compounds of formula I P-Sp-A-Sp-P  (I)

wherein P is a polymerisable group, Sp is a spacer group, and A is a mesogenic group RMs according to the invention are preferably selected from compounds of formula II P-Sp-Ar-Sp-Ar-Sp-P  (II)

wherein P is a polymerisable group, Sp is a spacer group, and Ar is an aromatic group Preferred spacer groups are an alkylene chain, polyether, poly-dialkylsiloxane. Spacer group R may be for example a group -(A-B)$_m$— with A=linear or branched alkylene, preferably with 1 to 12 carbon atoms, especially with 1 to 4 carbon atoms, B=O or S, preferably O, and m=0 to 5, preferably 1 to 3. In particular, the spacer group R is a group-(CH$_2$CHR—O)$_m$— with m=0 to 5, preferably 1 to 3, and R=H or C$_{1-4}$-alkyl, especially H or CH$_3$.

Further preferred are compounds of formula III

P-Sp-MG-Sp-P  (III)

wherein P and Sp have independently of one another the meanings given in formula I or one of the preferred meanings given above and below, and MG is a rod-shaped mesogenic group, which is preferably selected of formula IV

wherein
$A^3$ and $A^4$ are, in case of multiple occurrence independently of one another, an aromatic or alicyclic group, which optionally contains one or more heteroatoms selected from N, O and S, and is optionally mono- or polysubstituted by L as defined above,
$Z^3$ in case of multiple occurrence independently of one another denotes —O—, —S—, —CO—, —COO—, —OCO—, —S—CO—, —CO—S—, —O—COO—, —CO—NR$^0$—, —NR$^0$—CO—, —NR$^0$—CO—NR$^{00}$, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond, preferably —COO—, —OCO— or a single bond,
$R^0$ and $R^{00}$ independently of each other denote H or alkyl with 1 to 12 C-atoms,
$Y^1$ and $Y^2$ independently of each other denote H, F, Cl or CN,
n is 1, 2, 3 or 4, preferably 1 or 2, most preferably 2.

Preferred groups $A^3$ and $A^4$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, naphthalene, tetrahydronaphthalene, anthracene and phenanthrene, all of which are unsubstituted or substituted by 1, 2, 3 or 4 groups L as defined above.

Particular preferred groups $A^3$ and $A^4$ are selected from 1,4-phenylene, pyridine-2,5-diyl, pyrimidine-2,5-diyl, thiophene-2,5-diyl, naphthalene-2,6-diyl, 1,2,3,4-tetrahydro-naphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted or substituted by 1, 2, 3 or 4 groups L as defined above.

Preferred compounds of formula III are selected of formula IIIa

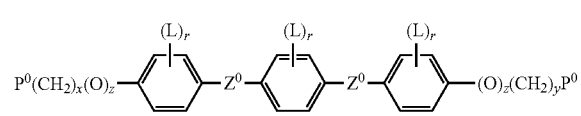

wherein
$Z^0$ is —COO—, —OCO—, —CH$_2$CH$_2$—, —CF$_2$O—, —OCF$_2$—, —C≡C—, —CH=CH—, —OCO—CH=CH—, —CH=CH—COO—, or a single bond,
$P^0$ is, in case of multiple occurrence independently of one another, a polymerisable group, preferably an acryl, methacryl, acrylamide, methacrylamide, oxetane, epoxy, vinyl, vinyloxy, propenyl ether or styrene group,
L has the meanings given in formula I and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
x and y are independently of each other 0 or identical or different integers from 1 to 12,
z is 0 or 1, with z being 0 if the adjacent x or y is 0.

Very preferred compounds of formula III are selected from the following formulae:

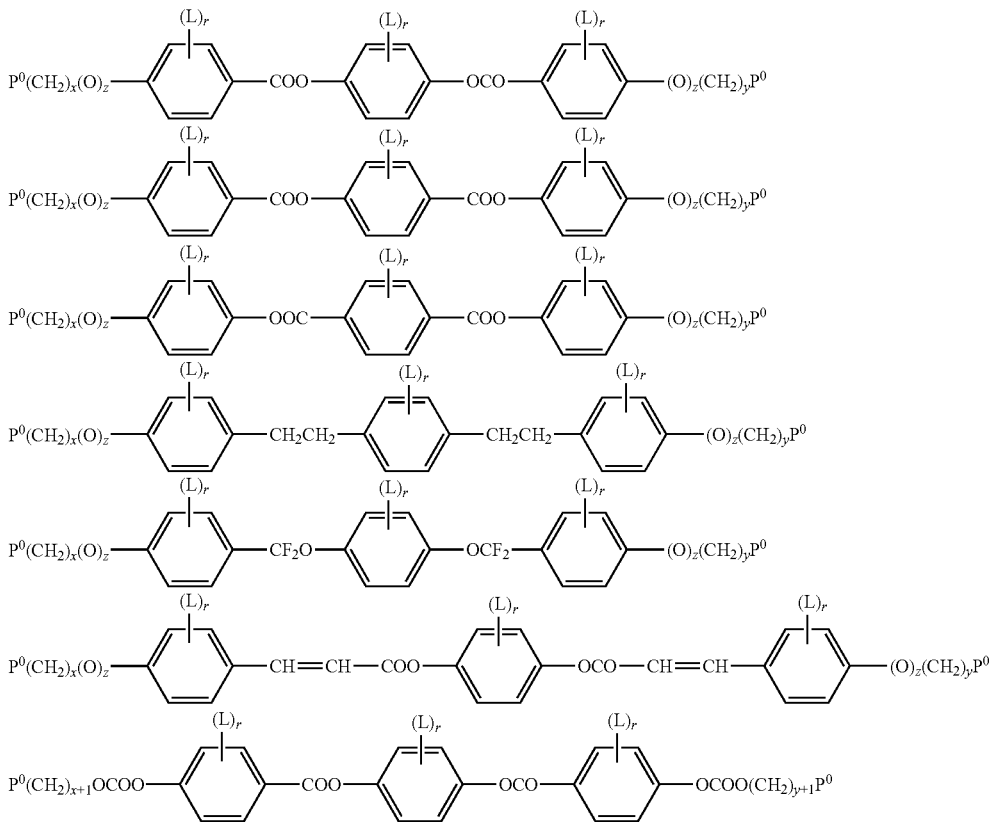

wherein $P^0$, L, r, x, y and z have the meanings given in formula IIIa or one of the preferred meanings given above and below. Especially preferred are compounds of formula IIIa1, IIIa2 and IIIa3, in particular those of formula IIIa1.

In addition to the compounds of formula I, II, III, IIIa and IIIa1-IIIa7 the RM mixture may also contain one or more further RMs. These further RMs are preferably calamitic monomers. Very preferably these further RMs are selected from the following formula:

P-Sp-MG-$R^2$  V wherein P, Sp and MG have the meanings given in formula I, III and IV, $R^2$ denotes P-Sp-, F, Cl, Br, I, —CN, —$NO_2$, —NCO, —NCS, —OCN, —SCN, —C(=O)$NR^0R^{00}$, —C(=O)X, —C(=O)$OR^0$, —C(=O)$R^0$, —$NR^0R^{00}$, —OH, —$SF_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, and $R^0$ and $R^{00}$ are independently of each other H or alkyl with 1 to 12 C-atoms.

The further RMs can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578. Examples of particularly suitable and preferred RMs are shown in the following list.

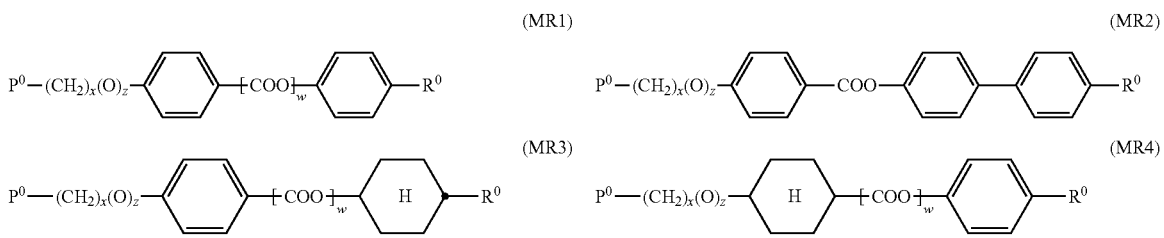

-continued
(MR5) (MR6)
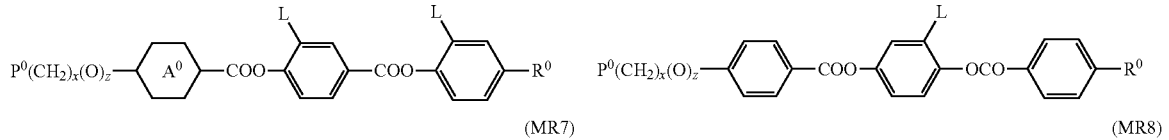
(MR7) (MR8)
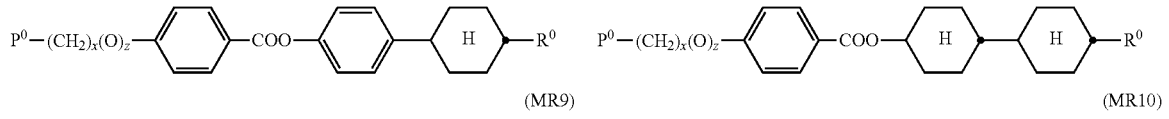
(MR9) (MR10)
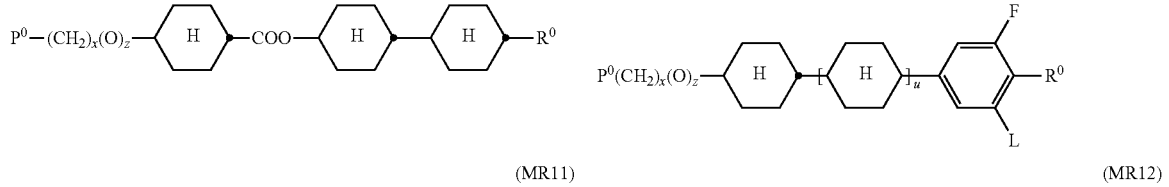
(MR11) (MR12)
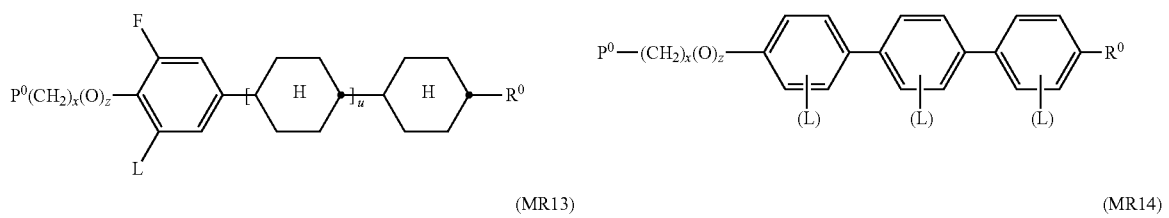
(MR13) (MR14)
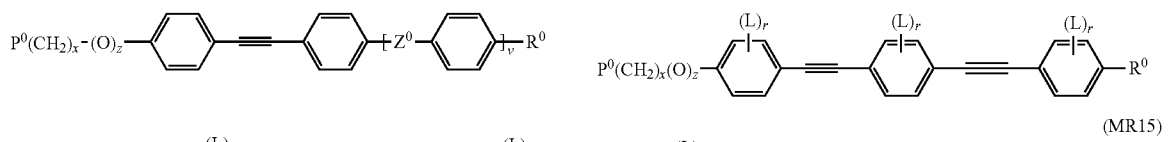
(MR15)
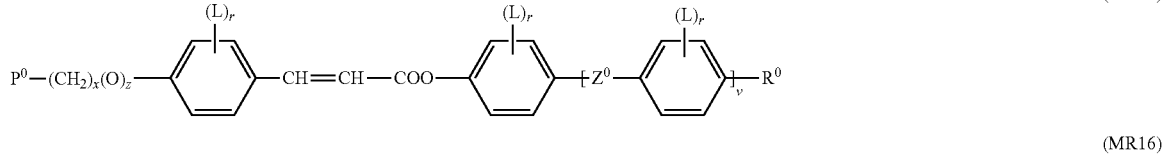
(MR16)
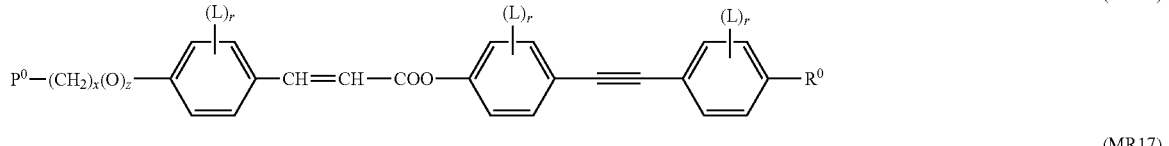
(MR17)
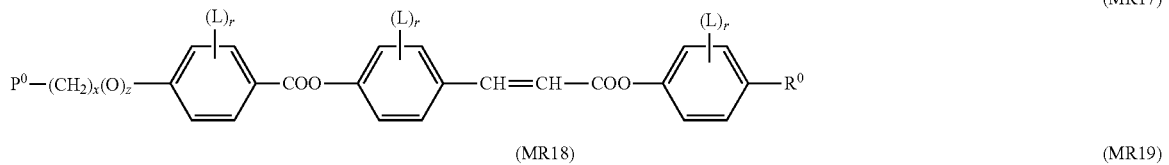
(MR18) (MR19)
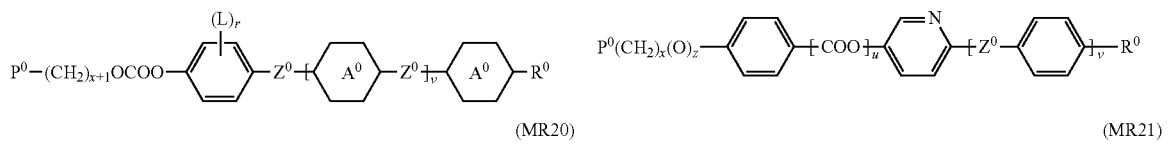
(MR20) (MR21)
(MR22)
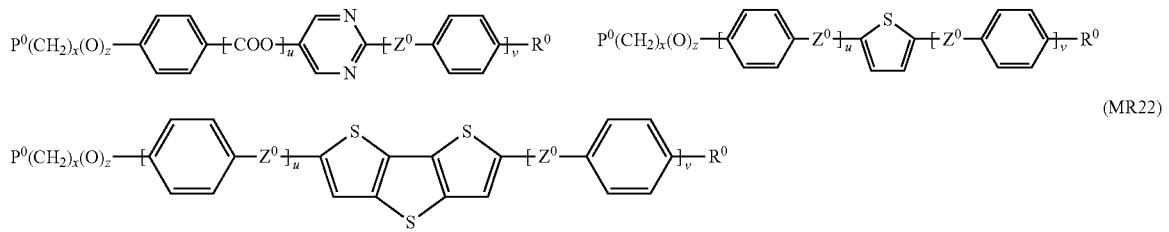

-continued
(MR23)
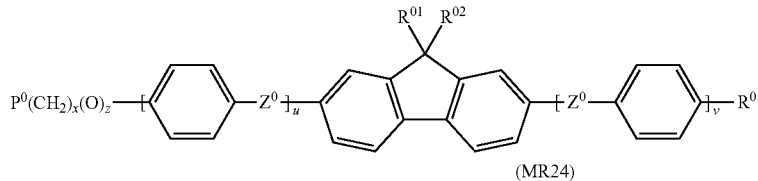
(MR24)
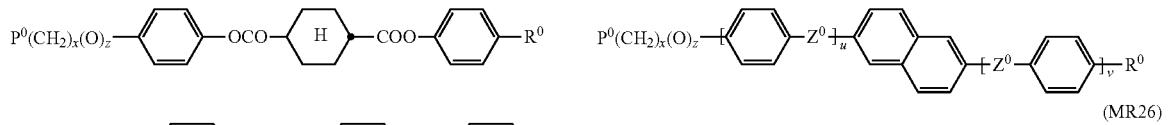
(MR25)
(MR26)
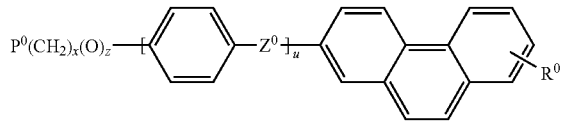
(DR1)
(DR2)
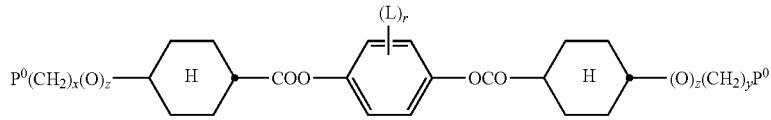
(DR3)
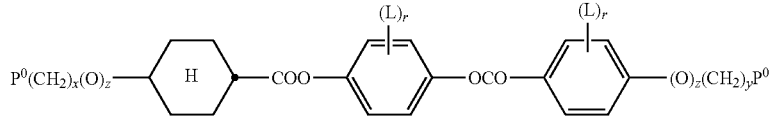
(DR4)
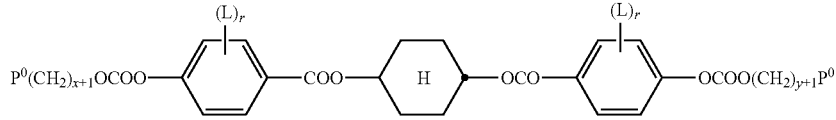
(DR5)
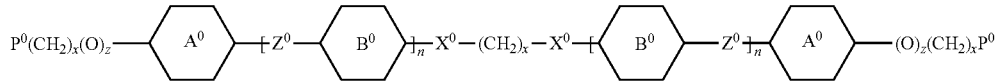
(CR1)
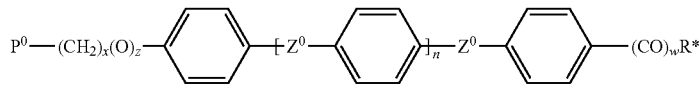
(CR2)
(CR3)
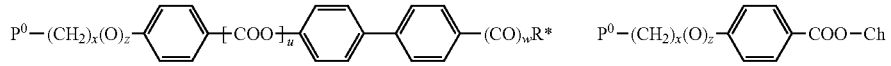
(CR4)
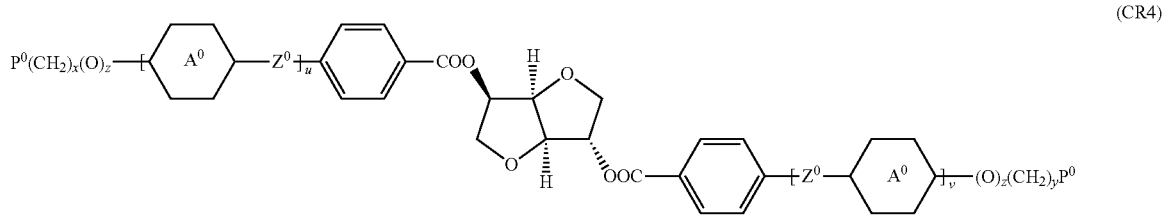

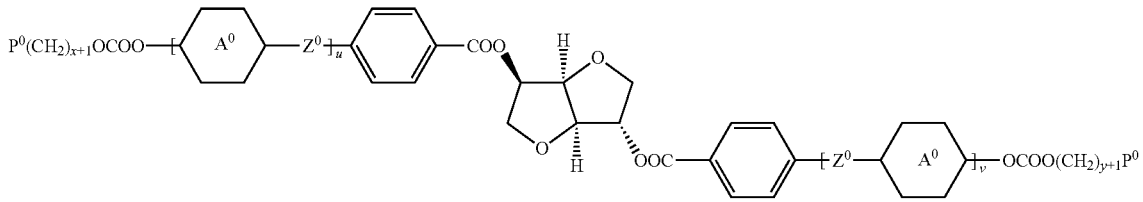
(CR5)

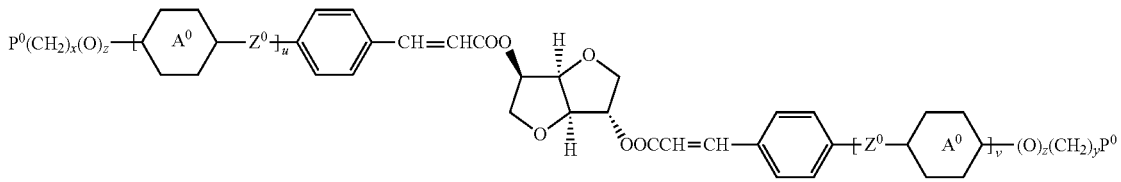
(CR6)

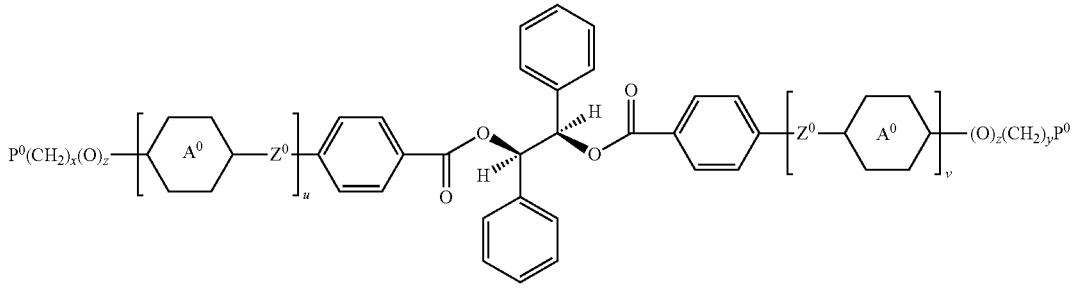
(CR7)

wherein $P^0$ is, in case of multiple occurrence independently of one another, a polymerisable group, preferably an acryl, methacryl, acrylamide, methacrylamide, oxetane, epoxy, vinyl, vinyloxy, propenyl ether or styrene group, $A^0$ and $B^0$ are, in case of multiple occurrence independently of one another, 1,4-phenylene that is unsubstituted or substituted with 1, 2, 3 or 4 groups L, or trans-1,4-cyclohexylene, $Z^0$ is, in case of multiple occurrence independently of one another, —COO—, —OCO—, —CH$_2$CH$_2$—, —CF$_2$O—, —OCF$_2$—, —C≡C—, —CH=CH—, —CH=CH—COO—, —OCO—CH=CH— or a single bond, $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is $Y^0$ or P—(CH$_2$)$_y$—(O)$_z$—, $X^0$ is —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{01}$—, —CF=CF—, —C≡C—, —CH=CH—COO—, —OCO—CH=CH— or a single bond $Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, $R^{01,02}$ are independently of each other H, $R^0$ or $Y^0$, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, t is, in case of multiple occurrence independently of one another, 0, 1, 2 or 3, u and v are independently of each other 0, 1 or 2, w is 0 or 1, x and y are independently of each other 0 or identical or different integers from 1 to 12, z is 0 or 1, with z being 0 if the adjacent x or y is 0, and wherein the benzene and napthalene rings can additionally be substituted with one or more identical or different groups L.

In a most preferred variant of the invention at least one of the RMs selected from RM257, RMA, RMB, RMC, and RMD (all available from Merck), and LC242, and LC1057 (all available from BASF) is used.

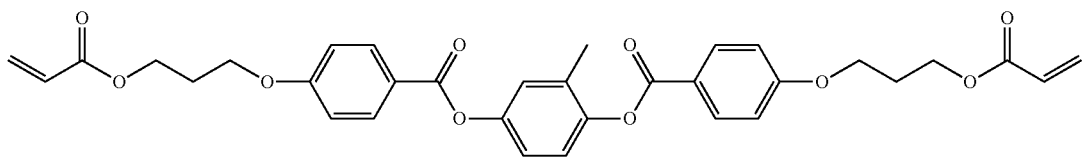

RM 257

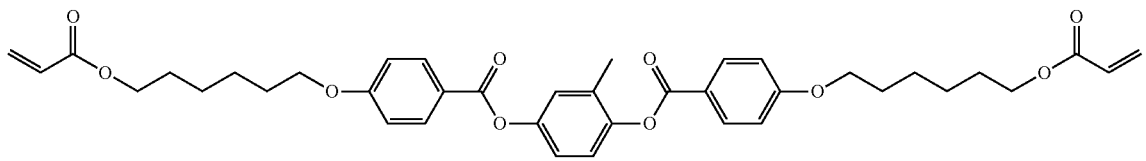

RM A

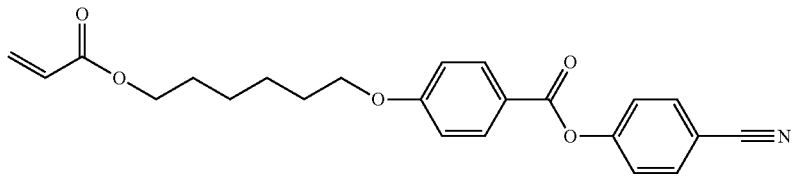

RM B

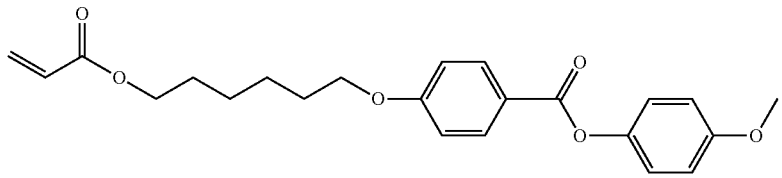

RM C

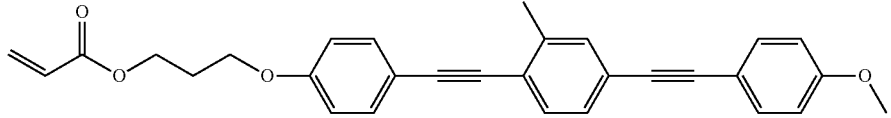

RM D

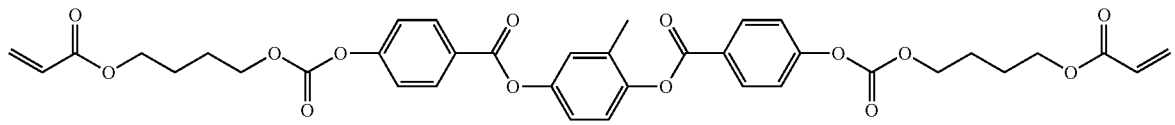

LC 242

Where there is a substantial difference in the two refractive indices (ordinary & extraordinary) in a reactive mesogen, a high value of birefringence can be achieved in a particle if it is polymerised to preserve the liquid crystalline order. This property could give rise to advantageous scattering reflecting or polarising effects and thus make the particles suitable for use in decorative and security applications. Preferably reflective particles have a refractive index >1.5, more preferably >1.7 and even more preferably >2.0. Especially RMD, LC242 (available from BASF) and RM257 can be used. These materials are well known to adopt liquid crystal properties under certain conditions.

Anisotropic liquid droplet materials at their lowest energy state adopt spherical shapes and it seems that if reactive mesogen materials are polymerised under the conditions disclosed, the shape of the polymerised droplet can vary from a sphere to a controllable anisotropic shape. This new shape is dependent on the liquid crystalline properties, (especially the nature of liquid crystalline alignment at the emulsion interface) and form of the starting materials. In general, RM particles made only from diacrylates tend to show anisotropic shapes while RM particles made only from monoacrylates exhibit spherical geometry. The shape of these RM particles can be tuned by temperature, nature of the thermal initiator and ratio of mono and diacrylate. In this way it is possible to obtain RM particles which exhibit anisotropic shape like spherical, toroidal (doughnut like) or red blood cell-like and tactoidal shape with even different aspect ratio.

The polymer particles of the invention may additionally comprise at least one co-monomer. The particles can be prepared from most monomer types, in particular methacrylates, acrylates, acrylamides, methacrylamides, acrylonitriles, α-substituted acrylates, styrenes and vinyl ethers, vinyl esters, and propenyl ethers. Mixtures of monomers may also be used.

The following are all examples which could be used and which are commercially available from the Sigma-Aldrich chemical company. Mixtures of monomers may also be used.
Methacrylates:

Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol)methylether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy)ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate. Preferably Methyl methacrylate (MMA), Methacrylic acid, Ethyl methacrylate (EMA), and/or n-Butyl methacrylate (BMA) are used.

Acrylates:

Acrylic acid, 4-Acryloylmorpholine, [2-(Acryloyloxy)ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, Di(ethylene glycol) ethyl ether acrylate technical grade, Di(ethylene glycol) 2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidised acrylate, 3-Sulfopropyl acrylate potassium salt, Tetrahydrofurfuryl acrylate, 3-(Trimethoxysilyl)propyl acrylate, 3,5,5-Trimethylhexyl acrylate.

Preferably Methyl acrylate, acrylic acid, Ethyl acrylate (EMA), and/or n-Butyl acrylate (BMA) are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl)trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl)acrylamide, N-(Isobutoxymethyl)acrylamide, N-Isopropylacrylamide, N-Isopropylmethacrylamide, Methacrylamide, N-Phenylacrylamide, N-[Tris(hydroxymethyl)methyl]acrylamide, Styrenes Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylpyridine, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl)trimethylammonium chloride, 4-Vinylbiphenyl, 2-Vinylnaphthalene, 2-Vinylpyridine, N-Vinyl-2-pyrrolidinone, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate, Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g. Glycidyl methacrylate, 2-Hydroxyethyl methacrylate.

The following compounds can be used as intraparticle cross-linking co-monomers monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl] 1,6-hexanediylbiscarbamate, Bis[4-(vinyloxy)butyl] isophthalate, Bis[4-(vinyloxy)butyl](methylenedi-4,1-phenylene)biscarbamate, Bis[4-(vinyloxy)butyl]succinate, Bis[4-(vinyloxy)butyl]terephthalate, Bis[4-(vinyloxymethyl)cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl]phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane di methacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3,1-propanediyl)]bisacrylate, Hydroxypivalyl hydroxypivalate bis[6-(acryloyloxy)hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl]isocyanurate, Tri(propylene glycol) diacrylate.

Optionally, the monomer composition comprises at least one ionic (charged) co-monomer.

Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino)propyl]trimethylammonium chloride, [2-(Methacryloyloxy)ethyl]trimethylammonium methyl sulfate solution, tetraallyl ammonium chloride, diallyl dimethyl ammonium chloride, (Vinylbenzyl)trimethylammonium chloride. Preferably 2-methacryloxy ethyl trimethyl ammonium chloride (MOTAC) and acryloxy ethyl trimethyl ammonium chloride (AOTAC) are used.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly(acrylic acid) potassium salt, Poly(acrylic acid) sodium salt, Poly(acrylic acid), Poly(acrylic acid, sodium salt) solution, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Polyacrylonitrile-co-butadiene-co-acrylic acid), dicarboxy terminated, Poly(acrylonitrile-co-butadiene-co-acrylic acid), dicarboxy terminated, glycidyl methacrylate diester, 2,3-Diphenyl-Acrylic Acid, 2-Me-Acrylic Acid, 3-(1-Naphthyl)Acrylic Acid, 3-(2,3,5,6-Tetramethylbenzoyl)Acrylic Acid, 3-(4-Methoxyphenyl)Acrylic Acid, 3-(4-Pyridyl)Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2-(2',4'-Difluoro[1,1'-Biphenyl]-4-Yl)-2-Oxoethyl]Acrylic Acid, 2-(2-(2-Chloroanilino)-2-Oxoethyl)-3-(4-Methoxyphenyl)Acrylic Acid, 2-(2-((2-Hydroxyethyl)Amino)-2-Oxoethyl)-3-(4-Methoxyphenyl)Acrylic Acid, 2-(2-(Cyclohexylamino)-2-Oxoethyl)-3-(4-Methoxyphenyl) Acrylic Acid.

Preferred co-monomers are methyl methacrylate, methyl acrylate, and methacrylic acid, acrylic acid, ethane-1,2 diacrylate, butane-1,4 diacrylate, hexane-1,6-diacrylate. Furthermore, mixtures of co-monomers described in the foregoing may be used. Preferred co-monomers mixtures comprise methyl methacrylate methyl acrylate, methacrylic acid, acrylic acid, ethane-1,2 diacrylate, butane-1,4 diacrylate, hexane-1,6-diacrylate, trimethylolpropane triacrylate, 2-methacryloxy ethyl trimethyl ammonium chloride (MOTAC) and/or acryloxy ethyl trimethyl ammonium chloride (AOTAC).

In a preferred variant of the invention, the polymer particles comprise at least one polymerisable dye as co-monomer. The function of the polymerisable dye is to colour the particle. The polymerisable dye consists of a chromophore, one or more polymerisable groups, optional linker groups (spacers), and optional groups to modify physical properties (like solubility, light fastness, etc.) and optionally charged group(s).

The polymerisable dye preferably comprises a chromophoric group and a functional group or plurality of functional groups selected from polymerisable groups, e.g. methacrylates, acrylates, methacrylamides, acrylonitriles, α-substituted acrylates, styrenes and vinyl ethers, vinyl esters, propenyl ethers, oxetanes and epoxys etc., in particular methacrylates and acrylates. In a preferred variant of the invention, the polymerisable dye comprises at least two polymerisable groups selected from an acrylate or methacrylate backbone.

The polymerisable group may be attached directly to the chromophoric group or may be attached through a linker group. An example of a suitable linker group is an optionally substituted alkyl chain, a polyether alkyl chain, a cycloalkyl or aromatic ring, heteroaromatic ring or a combination thereof.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phtalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups. Preferred chromophoric groups are azo groups (especially monoazo, and bisazo), anthraquinone and phthalocyanine groups.

Preferably the polymerisable dye comprises a chromophoric group and one or more functional groups selected from an acrylate or methacrylate backbone.

A polymerisable dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

Especially, the polymerisable dyes described in WO 2010/089057, WO 2010/089060 and WO 2012/019704 are suitable for incorporation in the polymer particles of the invention. Preferably acrylate or methacrylate derivatives of Disperse red 1, dyes of Formula 1, especially methacrylate or acrylate derivative of cationic Basic Blue 41, and dyes of Formula 2, especially with R5 and R6=CH$_3$ and Hal=Cl, and dyes of Formula 3, especially with R7 and R8=CH₃ are used as polymerisable dyes for the invention.

Formula 1

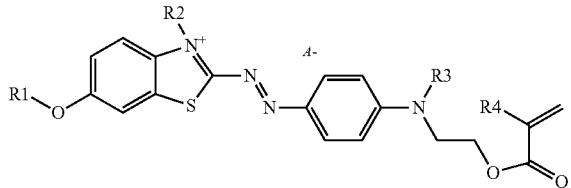

wherein R1,R2,R3=alkyl, preferably C1-C4 alkyl, R4=H or CH₃ A⁻=halogen, monobasic acid (oxo) anions, preferably acetate, propionate, lactate, methane sulphonate, p-toluenesulphonate, hydroxide, or nitrate, preferably with R1,R2, R4=CH₃ and R3=C₂H₅ and A⁺=methane sulfonate;

Formula 2

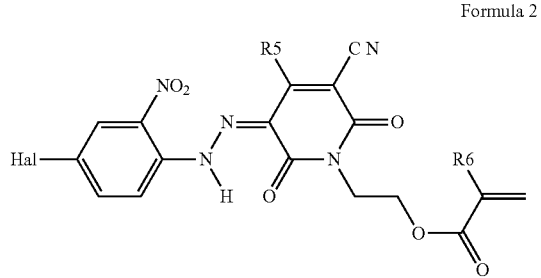

wherein R5=C1-C4 alkyl, preferably CH₃,
R6=H or CH₃, preferably CH₃,
Hal=halogen, preferably Cl;

Formula 3

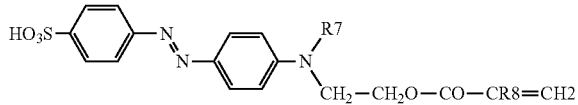

wherein R7=alkyl, preferably C1-C4 alkyl, especially CH₃,
R8=H or CH3, preferably CH₃.

Especially preferred are Disperse red 1 methacrylate, methacrylate derivative of cationic Basic Blue 41, and dye of Formula 3 with R7 and R8=CH₃. These dyes and their preparation are described in WO 2010/089057 and WO 2010/089060.

Preferred polymerisable dyes with at least two polymerisable groups are disclosed in WO 2012/019704 and may be chosen for example from compounds of Formula 4:

Formula 4

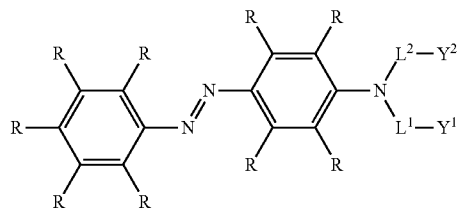

wherein
the aromatic or heteroaromatic cycles are substituted by one or more different or identical groups R selected from the group consisting of H, alkyl, preferably C1-C6 alkyl, substituted or non-substituted aryl, —F, —Cl, —Br, —I, —OR', —SR', —C(O)R', —C(O)OR', —NHCOR', —NO₂, —CN, —SO₃H, —NR'R", preferably —CH₃, —NO₂, —CN, —COCH₃, —CO₂CH₂CH₃, —NHCOCH₃, with R' and R" independently of one another equal to H or alkyl, preferably C1-C6 alkyl, and $L^1$ and $L^2$ are independently of one another a single bond, optionally substituted cycloalkyl or aromatic ring, linear or branched, optionally substituted, alkylene, where one or more non-adjacent C atoms may be replaced by O, S and/or N, and/or one or more double and/or triple bonds may be present in the chain and/or side chain or a combination thereof, preferably phenylene or C1-C6 alkyl, preferably identical, and $Y^1$ and $Y^2$ are independently of one another, polymerisable group, preferably acrylate or methacrylate, preferably identical Preferably groups R are selected from H, C1-C6 alkyl, preferably CH₃, —C(O)R', —C(O)OR', —NO₂, —CN, —NHCOR', with R' independently of one another equal to C1-C6 alkyl, preferably C1 or C2 alkyl.

Preferably groups $L^1$ and $L^2$ are selected from phenylene or C1-C6 alkyl, a polyether alkyl chain, or a combination thereof, preferably C2-C4 alkyl, especially C2 and C4 alkyl. Especially identical groups $L^1$ and $L^2$ are preferred.

Preferably groups $Y^1$ and $Y^2$ are selected from acrylate and methacrylate. Especially identical groups $Y^1$ and $Y^2$ are preferred.

N,N-bis-(2-Methacryloyloxyethyl)-4-(4-nitrophenylazo)-aniline (MR3) is particularly preferred. This dye may be prepared by reaction of commercial Cl Disperse Red 19 with methacryloyl chloride in the presence of triethylamine. Similar dyes may be prepared accordingly.

Preferably, an oil soluble initiator is used in the non-aqueous copolymerisation in order to control size, particle morphology and to reduce the residual monomers at the end of the reaction. Preferably an oil-soluble thermal initiator is added in step c) of the present process. Examples are 2,2'-Azobis(4-methoxy-2.4-dimethyl valeronitrile), 2,2'-Azobis(N-butyl-2-methylpropionamide), 2,2'-Azobis(2.4-dimethyl valeronitrile), Dimethyl 2,2'-azobis(2-methylpropionate), 2,2'-Azobis(2-methylbutyronitrile), also known as Vazo 67 (DuPont), 1,1'-Azobis(cyclohexane-1-carbonitrile), 2,2'-Azobis[N-(2-propenyl)-2-methylpropionamide], 1-[(1-cyano-1-methylethyl)azo]formamide, 2,2'-Azobis(N-cyclohexyl-2-methylpropionamide) (all available from Wako); Vazo 52 and Vazo 64 (available from DuPont), Luperox 331.

Preferably 2,2'-Azobis(2.4-dimethyl valeronitrile), Dimethyl 2,2'-azobis(2-methylpropionate), 2,2'-Azobis(2-methylbutyronitrile) or Vazo 67 are used.

Low refractive index monomers and RMs can be utilised to form polymer particles which have a low refractive index or birefringence, and could be useful if a closer optical match between the particle and a continuous phase medium is required, implying a lower degree of scattering, e.g. for a coating material or a filler particle in a display. Typical RMs with such properties are described in WO2008061606.

Charge can be incorporated into the particle by use of a charged or chargeable species preferably connected to a polymerisable group in the formation stage of the particle. If desirable, charge can be put onto the particle by use of a suitable surfactant after the particle has been made. Typical commercially available cationic charged monomers are [2-methacryloxyethyl]trimethyl ammonium chloride, acryloxy ethyl trimethyl ammonium chloride, [3-(methacryloylamino)propyl]trimethylammonium chloride, [2-(methacryloyloxy)ethyl]trimethylammonium methyl sulfate, tetraallyl ammonium chloride, diallyl dimethyl ammonium chloride, (vinylbenzyl)trimethylammonium chloride, examples of anionic monomers are sodium, potassium or triethylamine salts of methacrylic acid, acrylic acid, 2-(trifluoromethyl) acrylic acid.

All reactive mesogens and co-monomers described may be combined in any combination. In particular, preferred reactive mesogens and preferred co-monomers may be used in any combination.

Polymer particles with optical anisotropy and shape anisotropy comprising monomer units of at least one reactive mesogen with at least two polymerisable group, at least one polymerisable dye, optionally at least one co-monomer, optionally at least one cross-linking co-monomer, optionally at least one ionic co-monomer, and optionally at least one polymerisable stabiliser are preferably used in optical, electrooptical, electronic electrochemical, electrophotographic, electrowetting and electrophoretic displays and/or devices, and in security, cosmetic, decorative, and diagnostic applications. These polymer particles are especially used for the preparation of a mono, bi or polychromal electrophoretic device. Preferably, the new polymer particles with optical anisotropy and shape anisotropy comprising monomer units of at least one reactive mesogen with at least two polymerisable groups and at least one polymerisable dye are used, wherein the polymer particles comprise the preferred variants and combinations of reactive mesogens and co-monomers.

Furthermore, the present invention relates to a process for the preparation of polymer particles with optical anisotropy and shape anisotropy comprising at least one reactive mesogen with at least two polymerisable groups, and optionally at least one co-monomer comprising the steps of a) forming an emulsion comprising at least one reactive mesogen with at least two polymerisable groups, at least one non-polar solvent, at least one initiator, optionally at least one co-monomer and at least one surfactant, b) polymerising the monomer, and optionally c) separating, washing and/or drying the polymer particles.

Conventional polymerisation methods may be used in step b). Preferably the polymerisation according to the invention is a free radical polymerisation, preferably thermal polymerisation.

In the process of the invention, the emulsion of step a) is preferably prepared by a1) forming a monomer melt by mixing at least one reactive mesogen with at least two polymerisable groups, and optionally at least one co-monomer and heating to above its melting point a2) forming a non-polar phase by mixing at least one non-polar solvent, and at least one surfactant, a3) combining the monomer melt and the non-polar phase, and a4) homogenising the combined phases to form the emulsion.

In a further preferred variant of the invention, the emulsion of step a) comprises as co-monomer at least one polymerisable dye, at least one cross-linker and/or at least one ionic monomer.

It is especially preferred, that the surfactant used in step a) is a copolymer with a block, branched, graft or comb-like structure comprising at least one aliphatic block and at least one aromatic block.

The preferred variants and combinations of reactive mesogens and co-monomers as described in the foregoing are preferably used in the process according to the invention.

The process developed here has the advantage over those described in the state of the art that it is industrially viable and can produce particles with one or a combination of the following properties which are useful in electrophoretic and liquid crystal displays:
  Shape anisotropy in a range of tuneable shapes
  Tuneable refractive index particles
  Polydomain liquid crystalline particles
  Liquid crystalline particles with global director configuration
  Coloured particles.

The process of the invention preferably provides a bimodal particle size distribution: small, preferably spherical particles and larger, optionally non-spherical particles. These two size distributions are easily separated by centrifugal separation.

The larger particles are preferably in the range of 1-20 micrometers and may be tactoidal particles, red blood cell-like particles or spherical particles. The small polymer particles according to the invention may have a size in the range of 50-1000 nm and preferably with a monodisperse size distribution. Preferred particle sizes are 100-1000 nm, especially 50-300 nm. Particle sizes are determined by photon correlation spectroscopy of non-aqueous particle dispersions by a common apparatus such as a Malvern NanoZS particle analyser, or by electron microscopy and image analysis.

Throughout the specification emulsion means that a solvent (preferably dodecane, or comparable aliphatic hydrocarbons) forms the continuous phase and an immiscible monomer optionally containing solvent forms the discontinuous phase.

A main advantage of the present process is that the particles are formed directly in a solvent which is highly suitable for applications such as an EPD fluid or other electrooptical displays in which the particles are either rotated or translated (or both) using an electric field. Therefore, no unwanted solvent contamination occurs in the final formulation. Also transfer to other solvents suitable this type of application is easily possible if required.

The emulsion of step a) is prepared by a1) forming a monomer melt by mixing at least one reactive mesogen and heating to above its melting point a2) forming a non-polar phase by mixing at least one non-polar solvent, and at least one surfactant, a3) combining the monomer melt and the non-polar phase, and a4) homogenising the combined phases to form the emulsion.

The emulsion is preferably formed using some form of shear. This shear may be in the form of high shear homogenisation by for example a Silverson homogeniser or sonication by for example a Branson Sonifer. It is often advantageous to form a pre-emulsion using low shear and then higher shear to form the desired particle size. The shear is preferably applied once the non-polar continuous phase and reactive mesogen based discontinuous phase have been formed, separately mixed until homogeneous and then combined to form a 2-phase system.

Charging the polymer can also be facilitated by using for particle preparation an initiator which is charged leaving that charge residing as an end-group on the polymer. Such examples are 2,2'-azobis(2-methylpropionamidine)dihydrochloride (V-50) (Wako Chemicals), potassium peroxodisulfate (KPS), ammonium peroxodisulfate (APS), sodium peroxodisulfate (SPS), 2,2'-azobiscyanovaleric acid (ACVA) (Wako Chemicals), 2,2'-azobis[2-(2-imidazolin-2-yl)propane]dihydrochloride (VA044) (Wako Chemicals).

However, charging does not have to come from the initiator fragment so initiators which can also be used are those such as 2,2'-azobis(isobutyronitrile) (AIBN) (Wako Chemicals), 2,2'-azobis(2-methylbutyronitrile) (Vazo 67) (Wako Chemicals), benzoyl peroxide, azobis cyclohexencarbonitril, dicumyl peroxide, lauroyl peroxide, tert-Butylperoxy benzoate, 2,5-Bis(tert-Butylperoxy)-2,5-dimethyl-3-hexane (Sigma-Aldrich).

Further essential components of the present process are surfactants. In this case the surfactants must contain an aliphatic block to disperse the particles in dodecane or other suitable aliphatic solvents and an aromatic block to adsorb to and associate with the reactive mesogen dispersed phase. Importantly, the surfactant must not disrupt the liquid crystalline phase of the particle either before or after polymerization but must have sufficient entanglement or adsorption to promote stability. This may be achieved by using a blend of surfactants or one single surfactant.

Preferable surfactants additives have some form of block, branched, graft or comb-like structure to maximize physical or chemical adsorption onto the surface of the particles. Long or branched hydrophobic tails are preferable to maximize the steric stabilization of the surfactant.

Typical surfactants (either by steric stabilisation or by use as a charging agent) are known to experts in the field and include (but are not limited to) block copolymers of the type A-B or A-B-A, where one of the blocks is preferably and aromatic block for example polystyrene or polyvinylnaphthalene and the other a polyolefin for example polyethylene, polypropylene, polybutylene or polybutadiene. Commercially available Kraton G 1701 and Septon 1001, are suitable examples.

The continuous phase (preferably dodecane) is required to be a good solvent for the surfactant(s) being used.

The continuous phase solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5cst), low water solubility, a high boiling point (>80° C.) and density similar to that of the undyed particles. Adjustment of these variables can be useful in order to change the behaviour of the final application. Preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. Preferably dodecane, tetradecane, decane, nonane, and mixtures thereof are used. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachloroethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

All described process conditions and means may be combined in any combination. In particular, preferred process conditions and means may be used in any combination.

Polymer particles prepared by a process according to the invention are preferably used in optical, electrooptical, electronic electrochemical, electrophotographic, electrowetting and electrophoretic displays and/or devices, and in security, cosmetic, decorative, and diagnostic applications. Especially, these polymer particles are used for the preparation of a mono, bi or polychromal electrophoretic device.

The polymer particles prepared by the present process are especially suitable in the optical display field because there is need for new display modes providing a good bright and black state and the ability to switch between both states more quickly at lower voltages than the current displays.

The polymer particles prepared by the present process are preferably suitable for low power, low cost and light weight display devices. EPDs (Electrophoretic Displays) can fulfil this requirement.

The present invention furthermore relates to an electrophoretic fluid comprising polymer particles with optical anisotropy and optionally shape anisotropy comprising monomer units of at least one reactive mesogen with at least one polymerisable group, optionally one co-monomer, optionally at least one polymerisable dye, optionally at least one cross-linking co-monomer, optionally at least one ionic co-monomer, and optionally at least one polymerisable stabiliser.

Preferably, the electrophoretic fluid comprises polymer particles having monomer units of at least one reactive mesogen with at least two polymerisable groups. Especially preferred are electrophoretic fluids comprising polymer particles with monomer units of at least one polymerisable dye.

The reactive mesogens as well as the other monomers, i.e. co-monomer, polymerisable dye, cross-linking co-monomer, ionic co-monomer, and polymerisable stabiliser, and mixtures of reactive mesogens and mixtures of reactive mesogens and monomers may be selected from the compounds described in the foregoing. Especially preferred variants and combinations may be used for electrophoretic fluids according to this invention.

One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged electrophoretic particles dispersed in a fluid and constrained between two substrates, each comprising one or more electrodes. The space between the electrodes is filled with a dispersion medium which is colourless or a different colour to the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white or light colour. The use of different coloured particles in a single pixel has been exemplified in recent patent literature (U.S. Pat. No. 7,304,634, GB 2 438 436, US 2007/0268244).

There continues to be a demand for improved electrophoretic fluids and a simple preparation of particles which can be easily dispersed in non-polar media. An improved route to provide polymeric particles and new electrophoretic fluids has now been found.

The invention provides a simple way to coloured or uncoloured polymer particles having optical and optionally shape anisotropic suitable for EPD and it is possible to manipulate charge, size, polydispersity, steric stability, shape form, aspect ratio etc. separately in order to produce particles with all the desired features for EPD. This previously unknown process advantageously is a one step, one pot synthesis, using materials well known in other application areas, and the use of largely non-hazardous materials is preferred.

Particles of the invention are for use in electrophoretic displays, especially for use in mono, bi or polychromal electrophoretic devices. A typical electrophoretic display comprises an electrophoretic fluid comprising the particles dispersed in a low polar or non-polar solvent along with additives to improve electrophoretic properties, such as stability and charge. Examples of such electrophoretic fluids are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

The present reactive mesogen polymer particles may also be used in combination with coloured polymer or white reflective EPD particles.

Preferably the coloured polymer particles comprise a polymerised or co-polymerised dye. Especially coloured copolymers comprising monomer units of at least one monomer, of at least one polymerisable dye, optionally of at least one charged co-monomer, and optionally of at least one crosslinking co-monomer are preferred. The polymerisable dye comprises preferably a chromophore, preferably an azo group, anthraquinone group or phthalocyanine group, one or more polymerisable groups, and optional linker groups. To enhance the surface stabilisation or steric repulsions of the coloured polymeric particles in a non-polar continuous phase, a steric stabiliser is preferably incorporated into the coloured polymer particles.

Suitable coloured polymer particles are prepared by colouring polymer particles with a dye as described in WO 2009/100803 or with a pre-polymerised dye as described in the earlier patent application WO 2010/089058. Also suitable are coloured polymer particles prepared by colouring polymer particles with a polymerisable dye and subsequent polymerisation of the dye as described in the earlier patent application WO 2010/089059.

Suitable coloured polymer particles are preferably prepared by emulsion polymerisation, especially by an emulsifier-free batch emulsion polymerisation process, as described in the earlier patent application WO 2010/089060. A preferred emulsion polymerisation composition comprises a polymerisable dye, methyl methacrylate and ethylene glycol dimethacrylate as a cross-linker and 2-methacryloxy ethyl trimethyl ammonium chloride (MOTAC) as reactive charged monomer Suitable coloured polymer particles are also especially preferably prepared by copolymerisation in a non-aqueous, non-polar solvent, especially by copolymerisation of a polymerisable dye, methyl methacrylate (MMA), methacrylic acid, stabiliser, and initiator, as described in the earlier patent application WO 2010/089057.

Especially coloured polymer particles derived from polymerisable dyes described in the earlier patent applications WO 2010/089057, WO 2010/089059, and WO 2010/089060, preferably WO 2010/089057, are suitable for combinations with white reflective particles of the present invention.

It is also possible to combine the present polymer particles with particles prepared by a RESR process comprising the steps of a) forming a reverse emulsion comprising at least one polymer, at least one white reflective particle, at least one polar solvent, at least one non-polar solvent, and at least one surfactant and b) removing the polar solvent or polar solvents by evaporative methods.

The present process provides a route to tunably anisotropic shaped particles. Shape Anisotropy in EPD is advantageous. An important parameter in the electrophoretic device is the speed of switching which is in turn related to the charge and shape factor of a particle. In this case, a particle which retains the same volume but has low drag in one special orientation would move more quickly in a device than an equivalent spherical particle of the same volume.

The present process also provides a route to tune charge and charge anisotropy of particles. This parameter can be further influenced by charge added to the particle through copolymerisation of a suitable monomer. If this charge can further be aligned with the liquid crystalline director such that a particle could adopt charge anisotropy, this could further increase switching speeds of particles in display. This can be achieved by the use of a charged reactive mesogen containing suitable charged groups such as $COO^-$, $SO_3^-$, $NR_4^+$.

Particles of the invention may be used in optical, electrooptical, electronic, electrochemical, electrophotographic, electrowetting and electrophoretic displays and/or devices or may be used in security, cosmetic, decorative or diagnostic applications.

Particles of the invention are preferably designed for use in electrophoretic displays. So, further subjects of the invention are electrophoretic fluids and electrophoretic displays comprising a typical electrophoretic display which preferably consists of the particles dispersed in a low polar or non-polar solvent along with additives to improve electrophoretic properties, such as stability and charge. Examples of such electrophoretic dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

Typical additives to improve the stability of the fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5cst), low water solubility, a high boiling point (>80° C.) and density similar to that of the particles. Adjustment of these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachloroethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich).

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046. The Electrophoretic fluid is then incorporated into an Electrophoretic display element by a variety of pixel architectures, such as can be found in C. M. Lampert, Displays; 2004, 25(5) published by Elsevier B. V., Amsterdam.

The Electrophoretic fluid may be applied by several techniques such as inkjet printing, slot die spraying, nozzle spraying, and flexographic printing, or any other contact or contactless printing or deposition technique.

All EPD additives and solvents described may be combined in any combination. In particular, preferred additives and preferred solvents may be used in any combination.

Electrophoretic displays comprise typically, the electrophoretic display media in close combination with a monolithic or patterned backplane electrode structure, suitable for switching the pixels or patterned elements between the black and white optical states or their intermediate greyscale states.

The polymer particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are thus expressly also part of the disclosure content of the present application. The following examples explain the present invention in greater detail without restricting the scope of protection.

EXAMPLES

List of Abbreviations

V-59=Vazo 67: 2,2'-Azobis(2-methylbutyronitrile)
Luperox P: tert-Butyl peroxybenzoate
RM257: 2-methyl-1,4-phenylene-bis[4-(3-acryloyloxypropyloxy)benzoate]
RMD: Acrylic acid 3-{4-[4-(4-methoxy-phenylethynyl)-2-methyl-phenylethynyl]-phenoxy}-propyl ester.
RMB: 4-(6-Acryloyloxyhexyloxy)-benzoic acid (4-cyanophenyl ester).
Kraton G 1701 EU: linear diblock copolymer based on styrene and
ethylene/propylene, S-E/P, with bound styrene of 35% mass All chemicals are purchased from Sigma-Aldrich at the highest grade possible and are used without further purification unless otherwise stated. V-59 is purchased from Wako Chemicals and Vazo 67 is purchased from Du Pont. Reactive mesogens are synthesized and purified by Merck. Surfactants are available from Kraton and are used without further purification. Disperse Red 1 methacrylate is purchased from Sigma-Aldrich.

To homogenize the emulsion a Silverson Model STD1 with emulsion screen is used.

The characterisation of the formulations was performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Example 1

Preparation of a Particle Emulsion of RM257 with Red Blood Cell-Like Shape

RM257 (5.0 g) is placed in a beaker and heated until it melts. In another beaker 50.0 g of dodecane and 500 mg of Kraton G 1701 EU are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-necked 100 ml round bottomed flask which is pre-heated to 85° C. and flushed with nitrogen. The flask is equipped with a reflux condenser and an overhead stirrer with an impeller blade set at 400 rpm. Once the temperature of the emulsion is stabilised, Vazo 67 (thermal initiator) (250 mg) is dissolved in dodecane (5 ml) and is added to the reaction. Stirring and heating of the reaction is maintained for 2 hours to complete polymerisation. The reaction is cooled to room temperature and the emulsion is filtered through a 50 micrometer cloth.

Bimodal particle size distribution particles result from this reaction: small spherical particles in the range of 100 nm and larger red blood cell-like particles in the range 1-20 micrometers. These two size distributions are easily separated by centrifugal separation.

Example 2

Preparation of a Particle Emulsion of RM257 with Tactoidal Shape

RM257 (5.0 g) is placed in a beaker and heated until it melts. In another beaker 50.0 g of dodecane and Kraton G 1701 EU (500 mg) are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-necked 100 ml round bottomed flask which is pre-heated to 85° C. and flushed with nitrogen. The flask is equipped with a reflux condenser and an overhead stirrer with an impeller blade set at 400 rpm. Once the temperature of the reactants is stabilised, Luperox P (thermal initiator) (250 mg) is dissolved in dodecane (5 ml) and is added to the reaction. Stirring and heating of the reaction is maintained for 2 hours to complete polymerisation. The reaction is cooled to room temperature and the emulsion is filtered through a 50 micrometer cloth.

Bimodal particle size distribution particles result from this reaction: small spherical particles in the range of 100 nm and larger tactoidal particles in the range 1-20 micrometers. These two size distributions are easily separated by centrifugal separation.

Example 3

Preparation of Particle Emulsion of RMD

RMD (5.0 g) is placed in a beaker and heated until it melts. In another beaker dodecane (50 g) and Kraton G 1701 EU (500 mg) are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-necked 100 ml round bottomed flask which is pre-heated to 85° C. and flushed with nitrogen. The flask is equipped with a reflux condenser and an overhead stirrer with an impeller blade set at 400 rpm. Once the temperature of the reactants is stabilised, Luperox P (thermal initiator) (250 mg) is dissolved in dodecane (5 ml) and is added to the reaction. Stirring and heating of the reaction is maintained for 2 hours to complete polymerisation. The reaction is cooled to room temperature and the emulsion is filtered through a 50 micrometer cloth.

Bimodal particle size distribution particles result from this reaction: small spherical particles in the range of 100 nm and larger spherical particles in the range 1-3 micrometers. These two size distributions are easily separated by centrifugal separation.

Example 4

Preparation of a Red Coloured Particle Emulsion of RM257 and Disperse Red 1 methacrylate RM257 (5.0 g) and disperse red 1 methacrylate (0.125 g) are placed in a beaker and heated until they melts. In another beaker dodecane (50 g) and Kraton G 1701 EU (500 mg) are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-necked 100 ml round bottomed flask which is pre-heated to 85° C. and flushed with nitrogen. The flask is equipped with a reflux condenser and an overhead stirrer with an impeller blade set at 400 rpm. Once the temperature of the reactants is stabilised, Luperox P (thermal initiator) (250 mg) is dissolved in dodecane (5 ml) and is added to the reaction. Stirring and heating of the reaction is maintained for 2 hours to complete polymerisation. The reaction is cooled to room temperature and the emulsion is filtered through a 50 micrometer cloth.

Bimodal particle size distribution particles result from this reaction: small spherical particles in the range of 100 nm and larger tactoidal particles in the range 1-20 micrometers. These two size distributions are easily separated by centrifugal separation.

Example 5

Preparation of a Red Coloured Particle Emulsion of RM257 and Disperse Red 19 Dimethacrylate Step 1

N,N-bis-(2-Methacryloyloxyethyl)-4-(4-nitrophenylazo)-aniline (MR3)

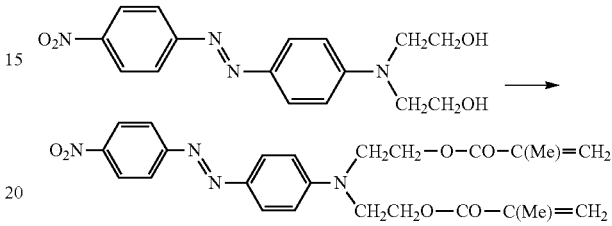

Methacryloyl chloride (3.51 ml, 3.76 g, 0.036 mol) in methylene chloride (10 ml) is added slowly to a stirred solution of commercial Cl Disperse Red 19 (95%, 5.0 g, 0.01438 mol) and triethylamine (8.01 ml, 5.8 g, 0.0575 mol) in methylene chloride (75 ml). The mixture is stirred overnight and methanol (50 ml) is added to give a sticky solid. Attempted crystallization from methanol gives a sticky solid which is triturated with further cold methanol. The resulting solid (MR3) is collected and washed with a further small quantity of methanol. Yield 6.0 g, 85%. M.p. 88-90° C.

Step 2

RM257 (5.0 g) and disperse red 19 dimethacrylate (0.125 g) are placed in a beaker and heated until they melted. In another beaker dodecane (50 g) and 500 mg of Kraton G 1701 EU are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-necked 100 ml round bottomed flask which is pre-heated to 85° C. and flushed with nitrogen. The flask is equipped with a reflux condenser and an overhead stirrer with an impeller blade set at 400 rpm. Once the temperature of the reactants is stabilised, Luperox P (thermal initiator) (250 mg) is dissolved in dodecane (5 ml) and is added to the reaction. Stirring and heating of the reaction is maintained for 2 hours to complete polymerisation. The reaction is cooled to room temperature and the emulsion is filtered through a 50 micrometercloth.

Bimodal particle size distribution particles result from this reaction: small spherical particles in the range of 100 nm and larger tactoidal particles in the range 1-20 micrometers. These two size distributions are easily separated by centrifugal separation.

Example 6

Preparation of a Charged Particle prepared from RM257 and a Cationic Monomer

RM257 (5.0 g) and a cationic monomer (0.10 g) are placed in a beaker and heated until they melt. In another beaker dodecane (50 g) and Kraton G 1701 EU (500 mg) are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-necked 100 ml round bottomed flask which is pre-heated to 85° C. and flushed with nitrogen. The flask is equipped with a reflux condenser and an overhead stirrer with an impeller blade set at 400 rpm. Once the temperature of the reactants is stabilised, Luperox P (thermal initiator) (250 mg) is dissolved in dodecane (5 ml) and is added to the reaction. Stirring and heating of the reaction is maintained for 2 hours to complete polymerisation. The reaction is cooled to room temperature and the emulsion is filtered through a 50 micrometer cloth.

Bimodal particle size distribution particles result from this reaction: small spherical particles in the range of 100 nm and larger tactoidal particles in the range 1-20 micrometers. These two size distributions can be easily separated by centrifugal separation.

Example 7

Preparation of a Particle Emulsion of Reactive Mesogen Mixture 3.75 g of RM257 and 1.25 g RMB are placed in a beaker and heated until they melted. In another beaker 50 g of dodecane and 500 mg of Kraton G 1701 EU are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-necked 100 ml round bottomed flask which is pre-heated to 85° C. and flushed with nitrogen. The flask is equipped with a reflux condenser and an overhead stirrer with an impeller blade set at 400 rpm. Once the temperature of the reactants is stabilised, Luperox P (thermal initiator) (250 mg) is dissolved in dodecane (5 ml) and is added to the reaction. Stirring and heating of the reaction is maintained for 2 hours to complete polymerisation. The reaction is cooled to room temperature and the emulsion is filtered through a 50 micrometer cloth.

Bimodal particle size distribution particles result from this reaction: small spherical particles in the range of 100 nm and larger tactoidal particles in the range 1-20 micrometers. These two size distributions are easily separated by centrifugal separation.

Example 8

Preparation of a Particle Emulsion from RM257 and a Chiral Reactive Mesogen

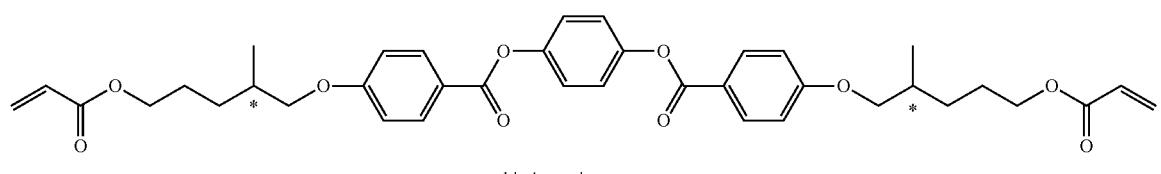

chiral reactive mesogen 5.0 g of RM257 and 0.150 g of the chiral reactive mesogen are placed in a beaker and heated until they melted. In another beaker 50 g of dodecane and 500 mg of Kraton G 1701 EU are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-neck 100 ml round bottomed flask which is pre-heated to 85° C. and flushed with nitrogen. The flask is equipped with a reflux condenser and an overhead stirrer with an impeller blade set at 400 rpm. Once the temperature of the reactants is stabilised, Luperox P (thermal initiator) (250 mg) is dissolved in dodecane (5 ml) and is added to the reaction. Stirring and heating of the reaction is maintained for 2 hours to complete polymerisation. The reaction is cooled to room temperature and the emulsion is filtered through a 50 micrometer cloth.

Bimodal particle size distribution particles result from this reaction: small spherical particles in the range of 100 nm and larger spherical particles in the range 1-20 micrometers, where the pitch can be identified. These two size distributions are easily separated by centrifugal separation.

Example 9

Preparation of a Particle Emulsion from RM257 and an Isotropic Triacrylate Co-Monomer

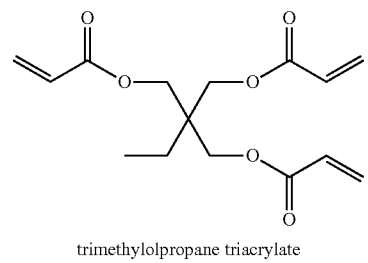 [SMILES: C=CC(=O)OCC(CC)(COC(=O)C=C)COC(=O)C=C]

trimethylolpropane triacrylate 4.5 g of RM257 and 0.5 g trimethylolpropane triacrylate are placed in a beaker and heated until they melted. In another beaker 50 g of dodecane and 500 mg of Kraton G 1701 EU are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-necked 100 ml round bottomed flask which is pre-heated to 85° C. and flushed with nitrogen. The flask is equipped with a reflux condenser and an overhead stirrer with an impeller blade set at 400 rpm. Once the temperature of the reactants is stabilised, Vazo-67 (thermal initiator) (250 mg) is added to the reaction. Stirring and heating of the reaction is maintained for 2 hours to complete polymerisation. The reaction is cooled to room temperature and the emulsion is filtered through a 50 micrometer cloth.

Bimodal particle size distribution particles result from this reaction: small spherical particles in the range of 100 nm and larger red blood cell-like particles in the range 1-20 micrometers. These two size distributions are easily separated by centrifugal separation.

Example 10

Preparation of a Particle Emulsion from RM257 and a Reactive Mesogen Triacrylate Co-Monomer

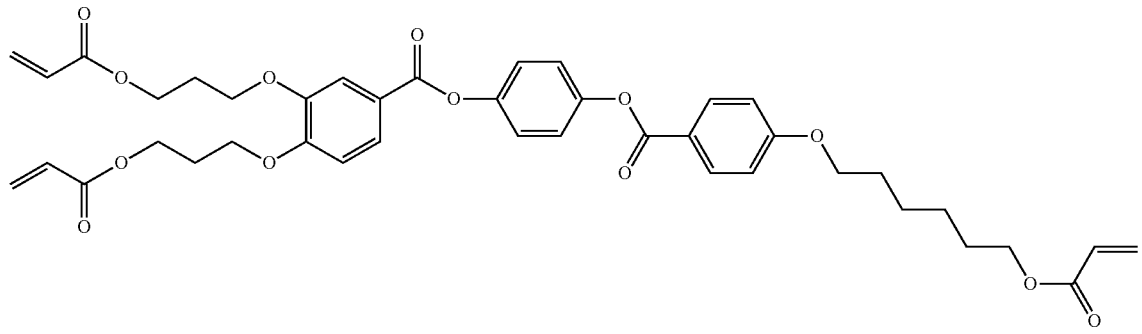

Reactive mesogen triacrylate 4.75 g of RM257 and 0.25 g of reactive mesogen triacrylate are placed in a beaker and heated until they melted. In another beaker 50 g of dodecane and 500 mg of Kraton G 1701 EU are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-necked 100 ml round bottomed flask which is pre-heated to 85° C. and flushed with nitrogen. The flask is equipped with a reflux condenser and an overhead stirrer with an impeller blade set at 400 rpm. Once the temperature of the reactants is stabilised, Vazo-67 (thermal initiator) (250 mg) is added to the reaction. Stirring and heating of the reaction is maintained for 2 hours to complete polymerisation. The reaction is cooled to room temperature and the emulsion is filtered through a 50 micrometer cloth.

Bimodal particle size distribution particles result from this reaction: small spherical particles in the range of 100 nm and larger red blood cell-like particles in the range 1-20 micrometers. These two size distributions are easily separated by centrifugal separation.

Example 11

Preparation of a Particle Emulsion from RM257 and a Benzoic Acid Reactive Mesogen Co-Monomer

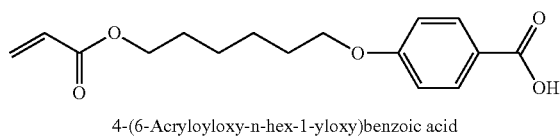 [SMILES: C=CC(=O)OCCCCCCOc1ccc(C(=O)O)cc1]

4-(6-Acryloyloxy-n-hex-1-yloxy)benzoic acid 5.0 g of RM257 and 0.225 g of benzoic acid reactive mesogen (Synthon Chemicals) are placed in a beaker and heated until they melted. In another beaker 50 g of dodecane and 500 mg of Kraton G 1701 EU are combined and stirred at 150° C. until the surfactant is dissolved. The solutions are combined and homogenised at 150° C. with a Silverson homogeniser for 8 minutes at 2000 rpm. At this point a stable emulsion is obtained. The emulsion is transferred into a 3-necked 100 ml round bottomed flask which is pre-heated to 85° C. and flushed with nitrogen. The flask is equipped with a reflux condenser and an overhead stirrer with an impeller blade set at 400 rpm. Once the temperature of the reactants is stabilised, Vazo-67 (thermal initiator) (250 mg) is added to the reaction. Stirring and heating of the reaction is maintained for 2 hours to complete polymerisation. The reaction is cooled to room temperature and the emulsion is filtered through a 50 micrometer cloth.

Bimodal particle size distribution particles result from this reaction: small spherical particles in the range of 100 nm and larger red blood cell-like particles in the range 1-20 micrometers. These two size distributions are easily separated by centrifugal separation.

Example 12

Preparation of a Particle Emulsion of Reactive Mesogen of Particle Size Under 200 nm Spherical particles less than 200 nm size can be synthesized as described in examples 1 to 7.

Bimodal particle size distribution particles result from this reaction: small spherical particles in the range of 100 nm and larger particles in the range 1-20 micrometers. These two size distributions are easily separated by centrifugal separation. Micrometer size particles remained in the bottom of the centrifuge tube while nanometer size particles stay in the supernatant. The supernatant from several washes/separations is collected and the particles are cleaned by stirred cell filtration using a Durapore membrane filter of pore size 100 or 220 nm.

Example 13

Electrophoretic Formulation Containing Red Blood Cell-Like Particles (See Example 1)

The electrophoretic ink is prepared by vortex mixing 0.0300 g of red blood cell-like shaped RM particles of example 1, 0.0511 g of AOT and 0.9258 g of dodecane. The dispersion is then roller mixed for 30 minutes, Bulk electrophoretic mobility $6.67 \times 10^{-10}$ $m^2V^{-1}s^{-1}$

Example 14

Electrophoretic Formulation Containing Tactoidal Particles Containing Red Dye (See Example 4)

The electrophoretic ink is prepared by vortex mixing 0.0303 g of dyed oriented tactoidal RM particles of example 4, 0.0498 g of AOT (Sigma-Aldrich), and 0.9175 g of dodecane (Sigma Aldrich). The dispersion is then roller mixed for 30 minutes.

Bulk electrophoretic mobility $8.43 \times 10^{-10}$ $m^2V^{-1}s^{-1}$

Example 15

Electrophoretic Formulation Containing RM Particles of Size Under 200 nm (See Example 12)

The electrophoretic ink is prepared by vortex mixing 0.0600 g of RM particles of example 7a, 0.0599 g of AOT (Sigma-Aldrich), and 1.8817 g of dodecane (Sigma Aldrich). The dispersion is then roller mixed for 30 minutes. Bulk electrophoretic mobility $-1.482 \times 10^{-10}$ $m^2V^{-1}s^{-1}$

Example 16

Electro-Optical Behaviour of Red Blood Cell-Like Particles in ITO Cells (See Example 1)

Red blood cell-like particles made of RMs (see example 1), show to switch under the action of an electric field. A scheme of the particle shape and director configuration is shown in FIG. 1. FIG. 1 shows a scheme of a red blood cell-like particle made of RM and internal LC director configuration (left) and image under cross-polarisers (right.)

Figure 2:
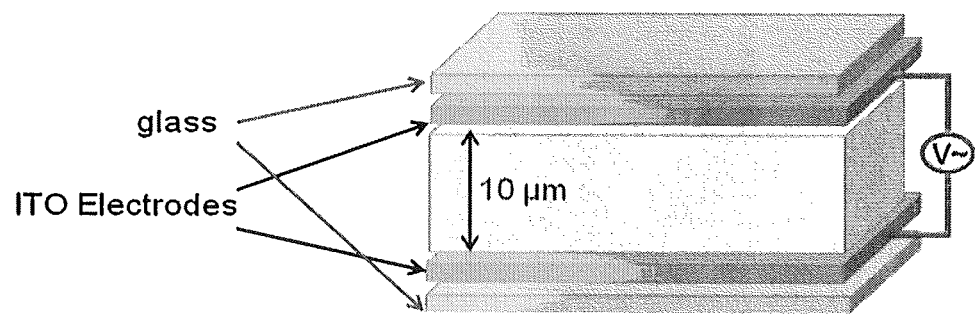
FIG. 2 shows a scheme of a cell with ITO top-bottom electrodes with 10 micron gap.

For the electro-optical experiments the particles are used as obtained from the synthesis without any further treatment. Particle dispersion is filled into the cell by capillarity at room temperature. The cells used for this experiment consist of a top-bottom glass cell with ITO layer electrodes and a 10 micron cell gap. The electric field is applied across the cell (see FIG. 2). FIG. 2 shows a scheme of a cell with ITO top-bottom electrodes with 10 micron gap.

Figure 3:
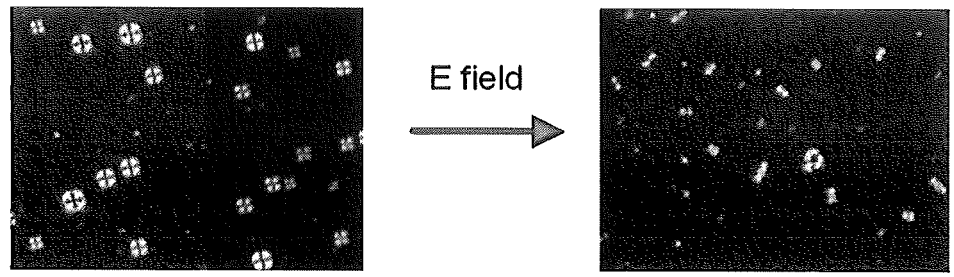
FIG. 3 shows images of particles in cells under cross-polarisers.

Initially particles are situated with the long surface parallel to the ITO plates inside the cell. When switching on the electric field the particles flip orienting the long surface perpendicular to the ITO plates. Removing the electric field, the particles relax and come back to the original position. This process is completely reversible. FIG. 3 shows images of the particle in the ITO cells under cross-polarisers with electric field switched off (left image) and when the electric field is on (right image). FIG. 3 shows images of particles in cells under cross-polarisers. Right image shows parallel alignment of the large surface of the particle with the glass. Left image shows perpendicular alignment when the electric field in on.

Figure 4:
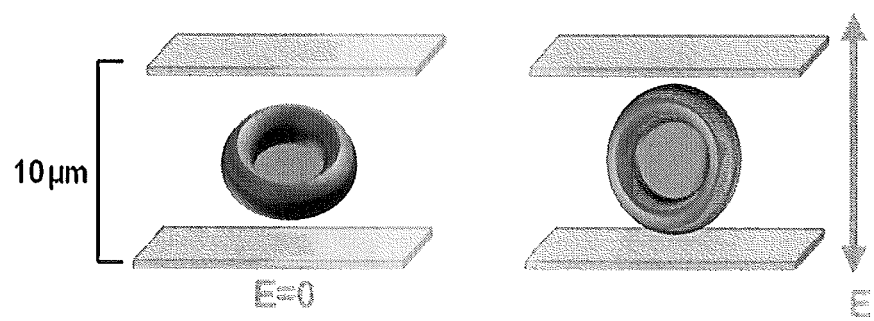
FIG. 4 shows a schematic representation of a red blood cell-like particle inside an ITO cell when the electric field is off (right image) and when it is on (left image).

The minimum voltage needed to rotate the particles is as low as 0.5 V/μm (100 Hz). A schematic draw of the rotation of a single particle in ITO cells is shown in FIG. 4, which corresponds with what was seeing under cross-polarisers in FIG. 3. FIG. 4 shows a schematic representation of a red blood cell-like particle inside an ITO cell when the electric field is off (right image) and when it is on (left image).

Example 17

Electro-Optical Behaviour of Tactoidal Particles in ITO Cells (See Example 2)

Figure 5:
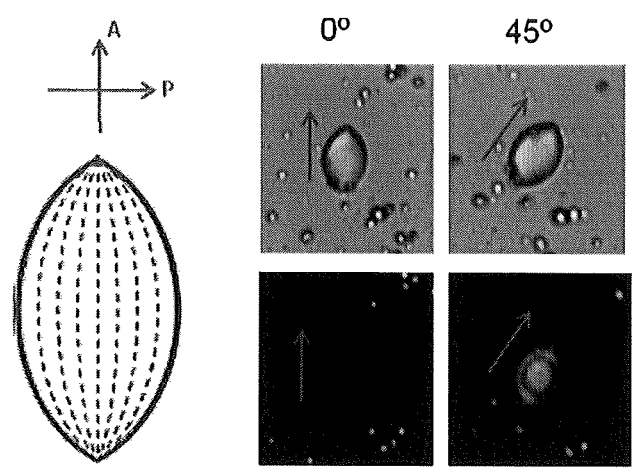
FIG. 5 shows a schematic representation of a tactoidal particle where the director adopts a bipolar configuration (left). Images under parallel (right above) and cross-polarisers (right below) of a tactoidal particle at 0° rotation and 45° rotation respect to analyser.

Tactoidal particles made of RMs (see example 2) show a good alignment of the liquid crystalline director, providing a good black and bright state under cross-polarisers (see FIG. 5). FIG. 5 shows a schematic representation of a tactoidal particle where the director adopts a bipolar configuration (left). Images under parallel (right above) and cross-polarisers (right below) of a tactoidal particle at 0° rotation and 45° rotation respect to analyser. Red arrow indicates director orientation inside the particle.

For the electro-optical experiments the particles are used as obtained from the synthesis without any further treatment. Particle dispersion is filled into the cell by capillarity at room temperature. The cells used for this experiment consist of a top-bottom glass cell with ITO layer electrodes and a 10 micron cell gap. The electric field is applied across the cell (see FIG. 2). These particles rotate continuously when the field is applied, 27 V/μm (100 Hz), switching between the black and bright state.

The invention claimed is:

1. A polymer particle with optical anisotropy and shape anisotropy comprising monomer units of at least one reactive mesogen with at least two polymerisable groups, at least one polymerisable dye, optionally at least one co-monomer, optionally at least one cross-linking co-monomer, optionally at least one ionic co-monomer, and optionally at least one polymerisable stabiliser.

2. The polymer particle of claim 1, wherein the polymerisable dye comprises azo dyes, metallised dyes, anthraquinone dyes, phthalocyanine dyes, benzodifuranones dyes, Brilliant Blue derivatives, pyrroline dyes, squarilium dyes, triphendioxazine dyes, or mixtures of these dyes.

3. The polymer particle of claim 1, wherein the particle exhibits internal molecular anisotropy.

4. A process for the preparation of polymer particles with optical anisotropy and shape anisotropy comprising at least one reactive mesogen with at least two polymerisable groups, and optionally at least one co-monomer, said process comprising
   a) forming an emulsion comprising at least one reactive mesogen with at least two polymerisable groups, at least one polymerisable dye, at least one non-polar solvent, at least one initiator, at least one surfactant, and optionally at least one co-monomer;
   b) polymerising the emulsion;
   and optionally
   c) separating, washing, and/or drying the polymer particles.

5. The process of claim 4, wherein the emulsion of step a) is prepared by:
   a1) forming a monomer melt by mixing at least one reactive mesogen with at least two polymerisable groups, at least one polymerisable dye, and optionally at least one co-monomer and heating to above its melting point;
   a2) forming a non-polar phase by mixing at least one non-polar solvent, and at least one surfactant;
   a3) combining the monomer melt and the non-polar phase; and
   a4) homogenising the combined phases to form the emulsion.

6. The process of claim 4, wherein the forming an emulsion of step a) further comprises, optionally at least one cross-linking co-monomer, and/or at least one ionic co-monomer.

7. The process of claim 4, wherein the surfactant is a copolymer with a block, branched, graft, or comb-like structure comprising at least one aliphatic block and at least one aromatic block.

8. Optical, electrooptical, electronic electrochemical, electrophotographic, electrowetting and electrophoretic displays and/or devices comprising the polymer particle of claim 1.

9. The electrophoretic device of claim 8, wherein the electrophoretic device is a mono, bi, or polychromal electrophoretic device.

10. Optical, electrooptical, electronic electrochemical, electrophotographic, electrowetting and electrophoretic displays and/or devices comprising the polymer particle obtained by the process of claim 4.

11. The electrophoretic device of claim 10, wherein the electrophoretic device is a mono, bi, or polychromal electrophoretic device.

12. An electrophoretic fluid comprising polymer particles with optical anisotropy and shape anisotropy comprising monomer units of at least one reactive mesogen with at least two polymerisable groups, at least one polymerisable dye, optionally at least one co-monomer, optionally at least one cross-linking co-monomer, optionally at least one ionic co-monomer, and optionally at least one polymerisable stabiliser.

13. An electrophoretic display device comprising the electrophoretic fluid of claim 12.

14. The electrophoretic display device of claim 13, wherein the electrophoretic fluid is applied by a technique selected from inkjet printing, slot die spraying, nozzle spraying, and flexographic printing, or any other contact or contactless printing or deposition technique.

15. The polymer particle of claim 2, wherein the azo dye is selected from the group consisting of monoazo dyes, disazo dyes, metallised azo dyes, and mixtures of these.

16. Security, cosmetic, decorative, and diagnostic applications comprising the polymer particle of claim 1.

17. Security, cosmetic, decorative, and diagnostic applications comprising the polymer particle obtained by the process of claim 4.

18. The polymer particle of claim 1, exhibiting electrophoretic mobility in a low dielectric media if subjected to an applied magnetic field.

19. The polymer particle of claim 1, wherein the at least one mesogen is selected from compounds of formula I or formula II, P-Sp-A-Sp-P      (I)

P-Sp-Ar-Sp-Ar-Sp-P      (II)

wherein P is a polymerisable group, Sp is a spacer group, A is a mesogenic group, and Ar is an aromatic group.

20. The polymer particle of claim 1, wherein the at least one mesogen is selected from compounds of formula III P-Sp-MG-Sp-P      (III)

wherein P is a polymerisable group, Sp is a spacer group, and MG is a rod-shaped mesogenic group of formula IV $-(A^3-Z^3)_n-A^4-$      (IV)

wherein $A^3$ and $A^4$ independent of one another, is selected from an aromatic or alicyclic group, which optionally contains one or more heteroatoms selected from N, O and S;

$Z^3$ independent of one another denotes —O—, —S—, —CO—, —COO—, —OCO—, —S—CO—, —CO—S—, —O—COO—, —CO—NR$^0$—, —NR$^0$—CO—NR$^{00}$, —NR$^0$CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH═N—, —N═CH—, —N═N—, —CH═CR$^0$—, —CY$^1$═CY$^2$—, —C≡C—, —CH═CH—COO—, —OCO—CH═CH— or a single bond; and R$^0$ and R$^{00}$, independent of each other, denote H or alkyl with 1 to 12 carbon atoms, Y$^1$ and Y$^2$, independent of each other, denote H, F, Cl or CN, and n is 1 or 2.

21. The polymer particle of claim 20, wherein the compounds of formula III are selected from

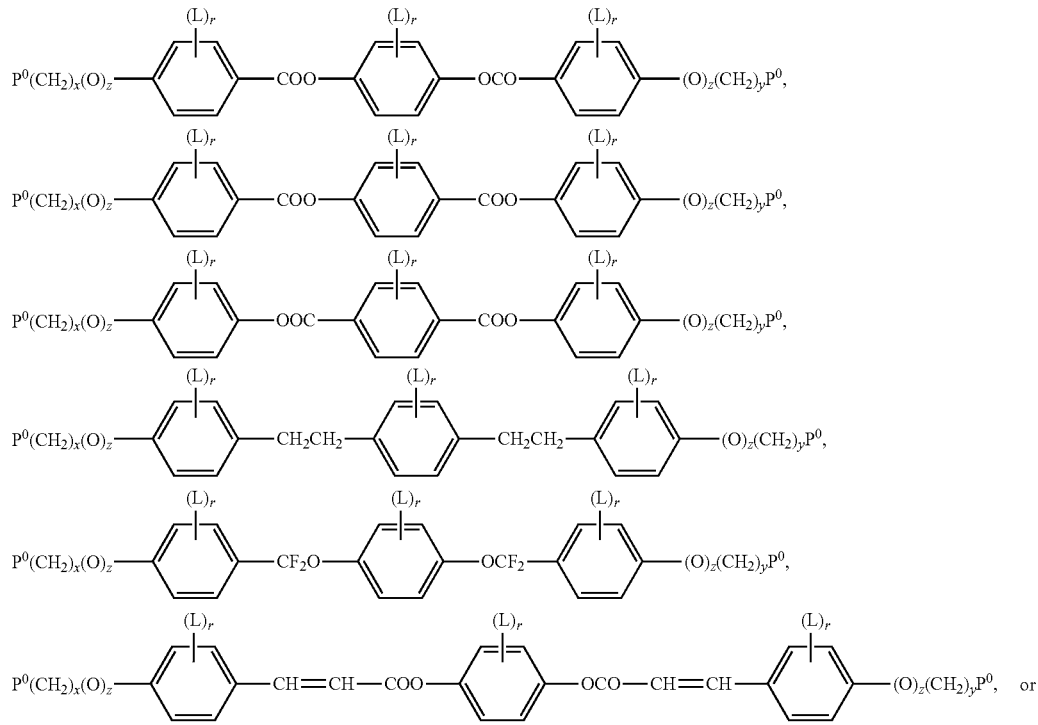

-continued
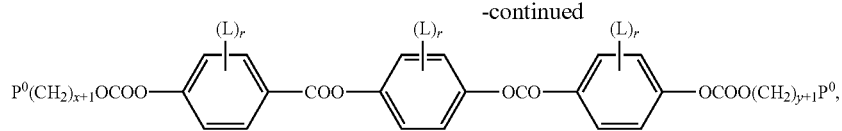
wherein L independent of one other, is F, Cl, CN or optionally halogenated alkyl, alkoxy, alkylcarbonyl, alkoxycarbonyl, alkylcarbonyloxy or alkoxycarbonyloxy with 1 to 5 carbon atoms;
r is 0, 1, 2, 3 or 4,
x and y, independent of each other, are identical or different integers from 1 to 12, and
z is 0 or 1, with z being 0 if the adjacent x or y is 0.
* * * * *